US007493177B2

(12) United States Patent
Ledbetter et al.

(10) Patent No.: US 7,493,177 B2
(45) Date of Patent: Feb. 17, 2009

(54) APPARATUS, SYSTEMS AND METHODS RELATING TO IMPROVED LIGHTING AND NOTIFICATIONS IN A COMPUTING SYSTEM

(75) Inventors: Carl J. Ledbetter, Mercer Island, WA (US); Steven T. Kaneko, Medina, WA (US); Markus Diebel, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 888 days.

(21) Appl. No.: 10/799,155

(22) Filed: Mar. 12, 2004

(65) Prior Publication Data

US 2004/0240167 A1 Dec. 2, 2004

Related U.S. Application Data

(60) Provisional application No. 60/468,389, filed on May 5, 2003.

(51) Int. Cl.
*G05B 11/01* (2006.01)
*G05B 15/00* (2006.01)

(52) U.S. Cl. .......................................... 700/17; 700/83

(58) Field of Classification Search .................. 700/17, 700/83

See application file for complete search history.

(56) References Cited

U.S. PATENT DOCUMENTS 7,113,196 B2 * 9/2006 Kerr ............................ 345/83
2002/0190975 A1 * 12/2002 Kerr ........................... 345/211
2003/0002246 A1 * 1/2003 Kerr ........................... 361/683
2004/0201573 A1 * 10/2004 Yu et al. ..................... 345/163

OTHER PUBLICATIONS

[Tweaknews]—Computer Monitor & Display Reviews; 7 pages.*
[TweakNews.net]—Samsung Synchmaster 151B Inch TFT Monitor Review—p. 1; 6 pages.*
[TweakNews.net]—Samsung Synchmaster 151B Inch TFT Monitor Review—p. 2; 8 pages.*
[TweakNews.net]—Samsung Synchmaster 151B Inch TFT Monitor Review—p. 3; 6 pages.*
Dobashi, Y. et al., "Skylight for Interior Lighting Design," *Computer Graphics Forum*, 1994, 13(3), C85-C96.
Godoy Simões, M. et al., "A RISC-Microcontroller Based Photovoltaic System for Illumination Applications," *APEC 2000. Fifteenth Annual IEEE Applied Power Electronics Conference and Exposition*, New Orleans, LA, Feb. 6-10, 2000, 2, 1151-1156.
Read, III, B.C. et al., "Developing the Next Generation Cockpit Display System," *Proceedings of the IEEE 1996 National Aerospace and Electronics Conference NAECON 1996*, Dayton, OH, May 20-23, 1996, 1, 411-415.
Read, III, B.C., "Develping the Next Generation Cockpit Display System," *IEEE Aerospace and Electronics Systems Magazine*, 1996, 11(10), 25-28.

* cited by examiner

*Primary Examiner*—Ronald D Hartman, Jr.
(74) *Attorney, Agent, or Firm*—Woodcock Washburn LLP

(57) ABSTRACT

Apparatus, systems and methods for enabling an improved computing ecosystem are provided. In various embodiments, the invention includes an improved monitor stand, integrating and providing intelligence to a computing system regarding any of a handset, camera, monitor and keyboard. Additionally, a structure including a transparent or opaque layer and a lighting component can be employed with any computing device or peripheral in the computing system to convey a lighting scheme to a user based upon a state of or notification in the computing system.

24 Claims, 36 Drawing Sheets

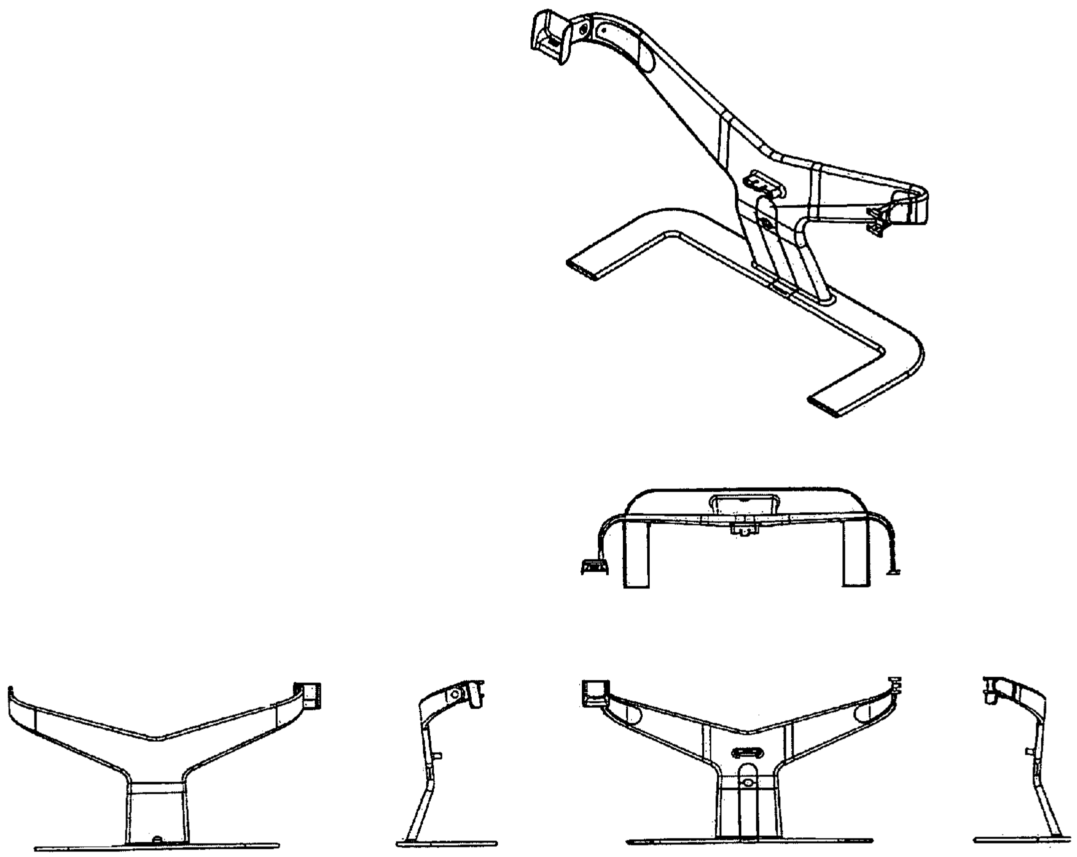
FIG. 3B
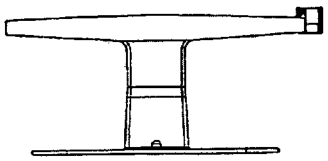

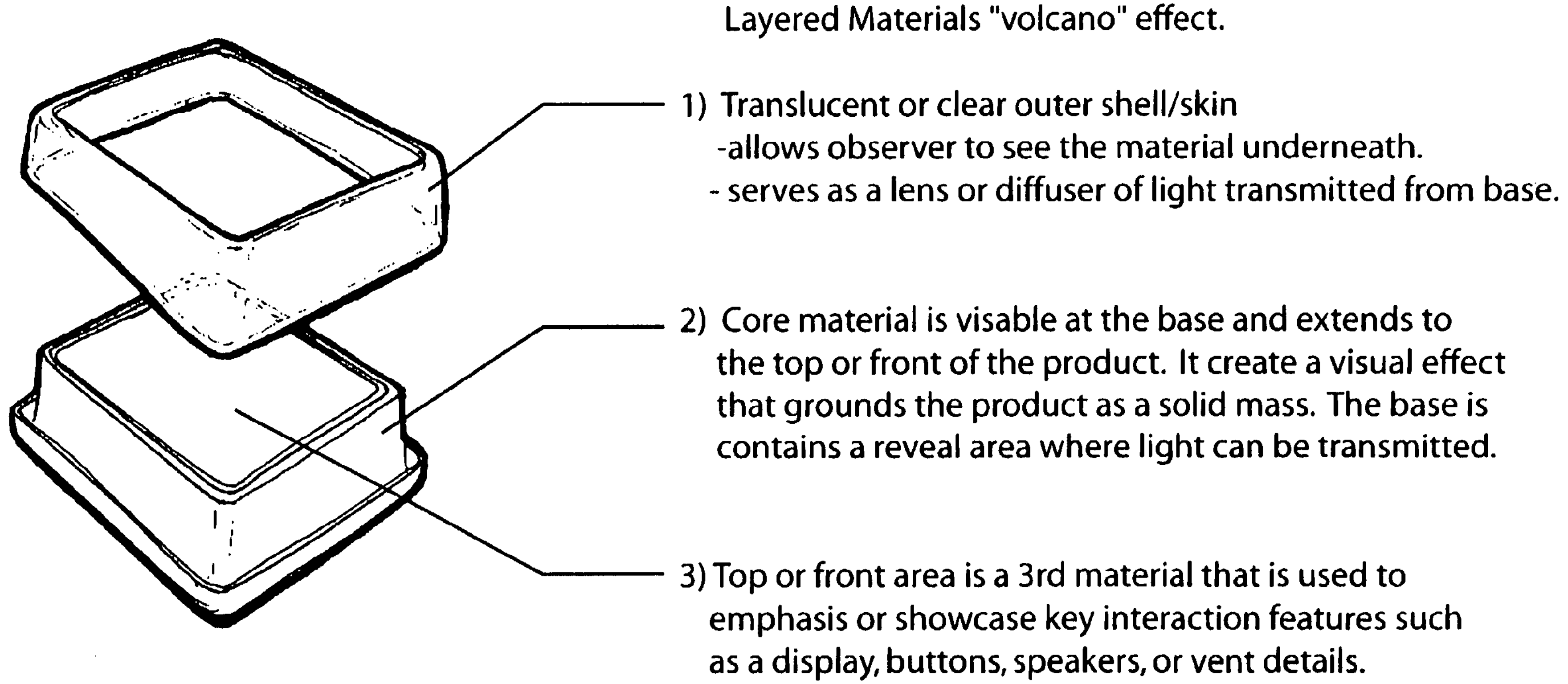

FIG. 7A

Layered Materials "volcano" effect.

1) Translucent or clear outer shell/skin
   - allows observer to see the material underneath.
   - serves as a lens or diffuser of light transmitted from base.

2) Core material is visable at the base and extends to the top or front of the product. It create a visual effect that grounds the product as a solid mass. The base is contains a reveal area where light can be transmitted.

3) Top or front area is a 3rd material that is used to emphasis or showcase key interaction features such as a display, buttons, speakers, or vent details.

APPARATUS, SYSTEMS AND METHODS RELATING TO IMPROVED LIGHTING AND NOTIFICATIONS IN A COMPUTING SYSTEM

CROSS-REFERENCE TO RELATED APPLICATIONS

This application claims the benefit of U.S. Provisional Application 60/468,389, filed May 5, 2003, entitled "Apparatus, Systems and Methods Relating to an Improved Computing Ecosystem."

FIELD OF THE INVENTION

The present invention is directed to apparatus, systems and methods that provide an improved computing ecosystem for a user, including the provision of improved structure(s), facilitating state notification, usability and communications.

BACKGROUND OF THE INVENTION

With the proliferation of wireless computing devices and peripherals for a PC computing environment, there has arisen a corresponding need to ease the use of computers from a user perspective. For instance, while cameras have existed for use with a computer for some time, the use has been ad hoc per application, and uncoordinated with the general computer ecosystem environment. Additionally, while keyboards, mice, smart displays, phones, cameras, peripherals and other devices have existed as standalone pieces, no thought has been given to the coordination (e.g., power management, synchronization, usability) of those devices via a common theme that provides advantages to the user over the present standalone view.

Thus, it would be desirable to provide an improved monitor stand with integrated electricity that operates as a power charging and data synchronization point for a variety of computing devices and peripherals. It would be further desirable to provide an improved monitor stand that integrates a handset (e.g., a mobile phone, personal digital assistant (PDA), etc.) and a camera. It would be still further desirable to integrate a keyboard into an improved monitor stand, wherein the keyboard is rechargeable when used in connection with the monitor stand. For instance, it would be desirable to provide a keyboard that mates with the legs of a monitor stand by sliding into a cradle formed by the monitor stand legs, whereby the keyboard begins recharging when the keyboard is mated, and operates wirelessly when unmated. It would be still further desirable to provide an improved monitor stand that has a V shaped or T shaped backing that retains a monitor, handset and camera, but also allows the monitor, handset and camera to independently pivot, and whereby integrated knowledge of the behavior of the monitor, handset and camera allows the computing system to provide seamless ease of use with respect to various combinatorial use of the monitor, handset and camera by a user.

It would also be advantageous to provide unique buttons on the keyboard that improve usability of the computing system ecosystem by enabling a user to skip complex software operations with the press of a single button on the keyboard. It would be still further desirable to improve the computing ecosystem by providing a state notification system (e.g., system state, power state, notifications, etc.) via lighting patterns/colors on any one or more device or peripheral in the computing system, e.g., monitor, CPU epicenter, mouse, keyboard, etc. In connection with such a state notification system, it would be desirable to provide a lighting scheme and corresponding structure that enables an opaque or translucent layer to propagate light in a fashion that pleasing to the eye, and generally consistent across devices that employ the lighting scheme.

SUMMARY OF THE INVENTION

Apparatus, systems and methods for enabling an improved computing ecosystem are provided. In various embodiments, the invention includes a structure including a transparent or opaque layer and a lighting component can be employed with any computing device or peripheral in the computing system to convey a lighting scheme to a user based upon a state of or notification in the computing system.

Other features and embodiments of the present invention are described below.

BRIEF DESCRIPTION OF THE DRAWINGS

The systems and methods for providing improved lighting and notifications in accordance with the present invention are further described with reference to the accompanying drawings in which:

FIGS. 7A and 7B illustrate exemplary non-limiting structure(s) for lighting scheme(s) enabled by the present invention;

DETAILED DESCRIPTION OF ILLUSTRATIVE EMBODIMENTS

Overview

As mentioned, the invention provides apparatus, systems and methods for enabling an improved computing ecosystem. A structure is provided that includes a transparent or opaque layer and a lighting component can be employed with any computing device or peripheral in the computing system to convey a lighting scheme to a user based upon a state of or notification in the computing system.

In various embodiments of the invention, a structure is provided for a computing device or peripheral including at least one lighting component and an opaque or translucent layer, whereby the lighting component propagates light through said layer according to a lighting scheme associated with a state of or notification in the computing system. For instance, any of a system state, a power state, a notification from another person, or a notification by the system may have a lighting scheme associated therewith, and when and how the lighting schemes occur can be configurable by a user.

Exemplary Networked and Distributed Environments

One of ordinary skill in the art can appreciate that a computer, smart display device or other client or server device can be deployed as part of a computer network, or in a distributed computing environment. In this regard, the present invention pertains to any computer system having any number of memory or storage units, and any number of applications and processes occurring across any number of storage units or volumes, which may be used in connection with computing objects. Thus, the present invention may or may not apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services that can take advantage of the ecosystem enabled by the present invention.

Distributed computing facilitates sharing of computer resources and services by direct exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the improved ecosystem of the invention.

Figure 1A:
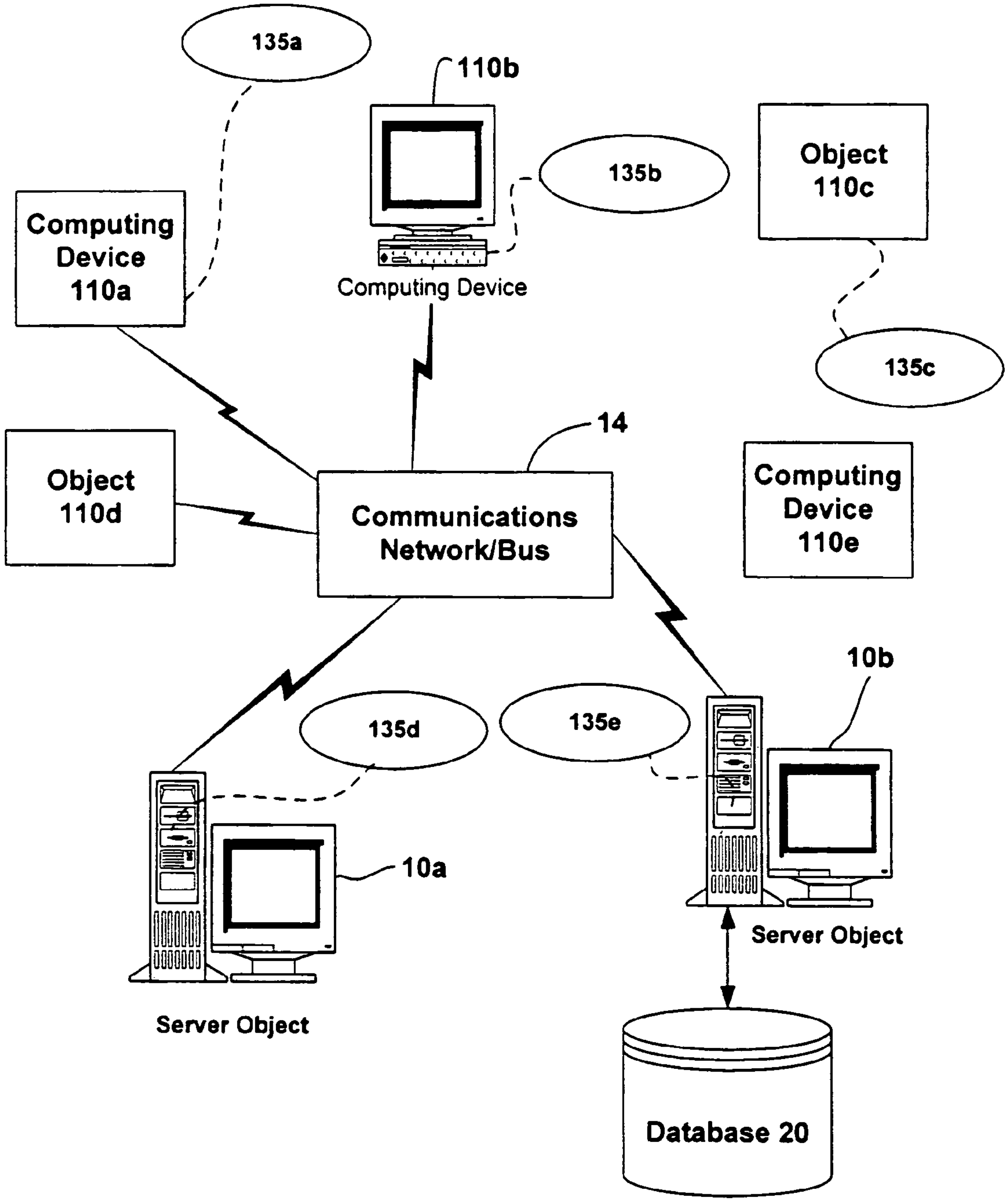
FIG. 1A is a block diagram representing an exemplary network environment having a variety of computing devices in which the various embodiments of the present invention may be implemented.

FIG. 1A provides a schematic diagram of an exemplary networked or distributed computing environment. The distributed computing environment comprises computing objects 10*a*, 10*b*, etc. and computing objects or devices 110*a*, 110*b*, 110*c*, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 1A. In accordance with an aspect of the invention, each object 10*a*, 10*b*, etc. or 110*a*, 110*b*, 110*c*, etc. may contain an application that might make use of an API, or other object, software or hardware, that is part of the improved ecosystem enabled by the invention.

It can also be appreciated that an object, such as 110*c*, may be hosted on another computing device 10*a*, 10*b*, etc. or 110*a*, 110*b*, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol, such as Power line, data (both wireless and wired), voice (e.g., telephone) and entertainment media. Most home control devices such as light switches and appliances may use power line for connectivity. Data Services may enter the home as broadband (e.g., either DSL or Cable modem) and are accessible within the home using either wireless (e.g., HomeRF or 802.11b) or wired (e.g., Home PNA, Cat 5, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also used as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of sharing data, such as data accessed or utilized incident to program objects, which may be utilized in connection with the improved computing ecosystem of the present invention.

The Internet commonly refers to the collection of networks and gateways that utilize the TCP/IP suite of protocols, which are well-known in the art of computer networking. TCP/IP is an acronym for "Transport Control Protocol/Internet Protocol." The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 1A, computers 110*a*, 110*b*, etc. can be thought of as clients and computer 10*a*, 10*b*, etc. can be thought of as the server where server 10*a*, 10*b*, etc. maintains the data that is then replicated in the client computers 110*a*, 110*b*, etc., although any computer could be considered a client, a server, or both, depending on the circumstances.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a URL address. For example, communication can be provided over a communications medium. In particular, the client and server may be coupled to one another via TCP/IP connections for high-capacity communication.

Thus, FIG. 1A illustrates an exemplary networked or distributed environment, with a server in communication with client computers via a network bus, in which the present invention may be employed. In more detail, a number of servers 10*a*, 10*b*, etc., are interconnected via a communications network/bus 14, which may be a LAN, WAN, intranet, the Internet, etc., with a number of client or remote computing devices 110*a*, 110*b*, 110*c*, 110*d*, 110*e*, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to improve the overall computing experience.

In a network environment in which the communications network/bus 14 is the Internet, for example, the servers 10*a*, 10*b*, etc. can be Web servers with which the clients 110*a*, 110*b*, 110*c*, 110*d*, 110*e*, etc. communicate via any of a number of known protocols such as HTTP. Servers 10*a*, 10*b*, etc. may also serve as clients 110*a*, 110*b*, 110*c*, 110*d*, 110*e*, etc., as may be characteristic of a distributed computing environment. Communications may be wired or wireless, where appropriate. Client devices 110*a*, 110*b*, 110*c*, 110*d*, 110*e*, etc. may or may not communicate via communications network/bus 14, and may have independent communications associated therewith. For example, in the case of a TV or VCR, there may or may not be a networked aspect to the control thereof. Each client computer 110*a*, 110*b*, 110*c*, 110*d*, 110*e*, etc. and server computer 10*a*, 10*b*, etc. may be equipped with various application program modules or objects 135 and with connections or access to various types of storage elements or objects, across which files may be stored or to which portion (s) of files may be downloaded or migrated. Any computer 10*a*, 10*b*, 110*a*, 110*b*, etc. may be responsible for the maintenance and updating of a database 20 or other storage element in accordance with the present invention, such as a database or memory 20 for storing data processed according to the invention. Thus, the present invention can be utilized in a computer network environment having client computers 110*a*, 110*b*, etc. that can access and interact with a computer network/bus 14 and server computers 10*a*, 10*b*, etc. that may interact with client computers 10*a*, 10*b*, etc. and other like devices, and databases 20.

Exemplary Computing Device

Figure 1B:
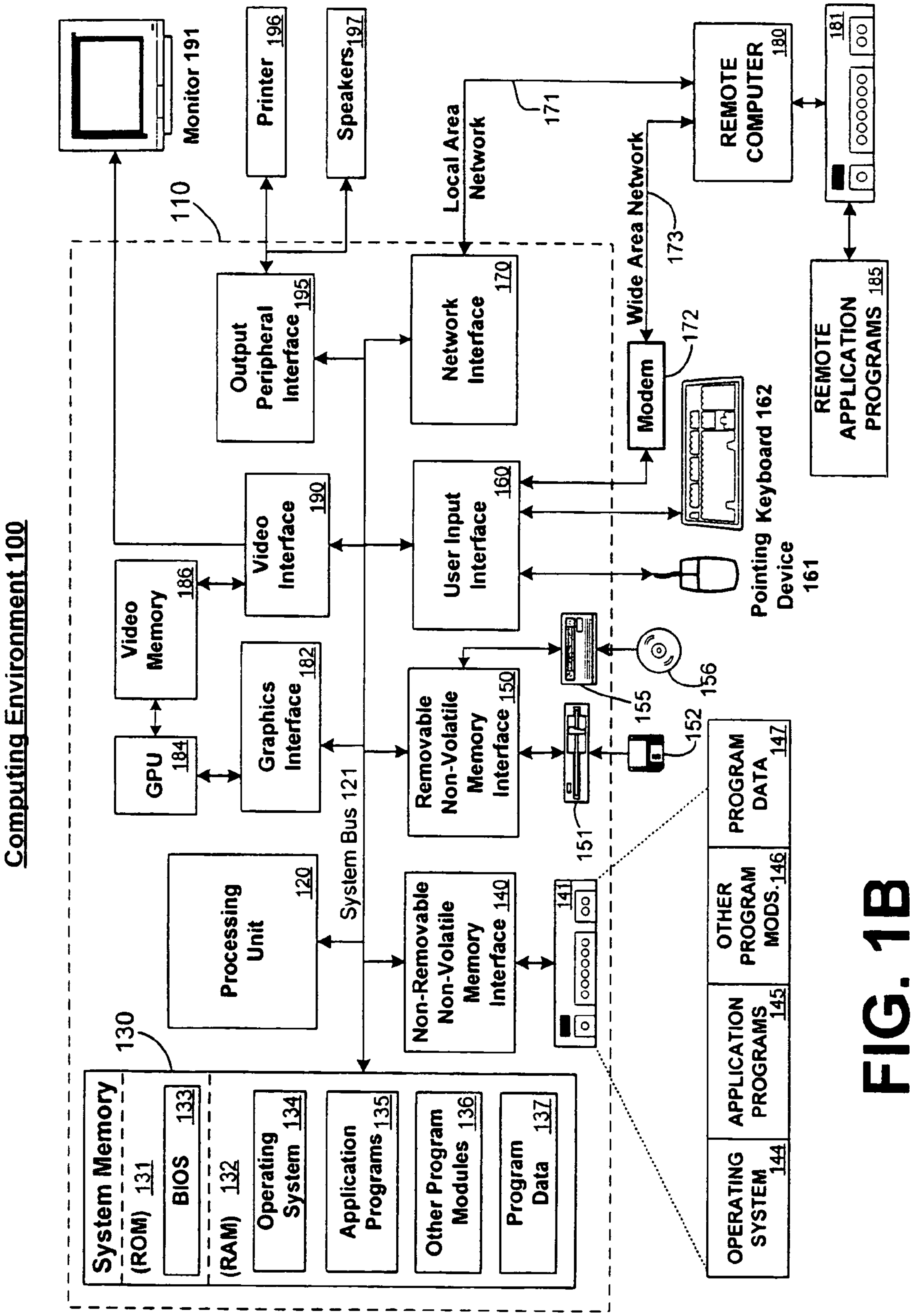
FIG. 1B is a block diagram representing an exemplary non-limiting computing device in connection with which various aspects of the present invention can be implemented.

FIG. 1B and the following discussion are intended to provide a brief general description of a suitable computing environment in which the invention may be implemented. It should be understood, however, that handheld, portable and other computing devices and computing objects of all kinds are contemplated for use in connection with the present invention. While a general purpose computer is described below, this is but one example. Smart displays and flat display monitors, for instance, are contemplated in connection with the stand of the invention, but the invention is not limited to flat display monitors. The present invention may be implemented in an environment of networked hosted services in which very little or minimal client resources are implicated, e.g., a networked environment in which the client device serves merely as an interface to the network/bus, such as an object placed in an appliance. In essence, anywhere there is a computing device or peripheral that would benefit from the techniques of the invention is a desirable, or suitable, environment for operation of the techniques of the invention.

Although not required, any software used with the invention can be implemented via an operating system, for use by a developer of services for a device or object, and/or included within application software that operates in connection with the devices or peripherals of the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 1B thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100. Moreover, while the PC architecture described may relate to some of the functionality on the software side of the invention, there are significant advantages to the hardware shown and described below in connection with the improved ecosystem of the invention.

With reference to FIG. 1B, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1B illustrates operating system 134, application programs 135, other program modules 136, and program data 137.

The computer 110 may also include other removable/non-removable, volatile/nonvolatile computer storage media. By way of example only, FIG. 1B illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1B provide storage of computer readable instructions, data structures, program modules and other data for the computer 110. In FIG. 1B, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186, wherein the application variables of the invention may have impact. GPUs 184, however, are but one example of a coprocessor and thus a variety of coprocessing devices may be included in computer 110, and may include a variety of procedural shaders, such as pixel and vertex shaders. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1B. The logical connections depicted in FIG. 1B include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1B illustrates remote application programs 185 as residing on memory device 181. It will be appreciated that the network connections shown are exemplary and other means of establishing a communications link between the computers may be used.

In one aspect of the invention, most of the above-described PC architecture is conceptually thought of as the "CPU box" and the invention in turn focuses on behavior by and on behalf of the user that improves the overall computing experience and overall PC architecture. Thus, the invention relates generally to improved externalities that are exposed to a user through hardware, and which are exploited with intelligent firmware/software that improves usability of the personal computing experience, and thus the overall ecosystem.

Apparatus, Systems and Methods for Providing an Improved Computing Ecosystem

Apparatus, systems and methods for enabling an improved computing ecosystem are provided in accordance with the invention. In various embodiments, the invention includes an improved monitor stand, integrating and providing intelligence to a computing system regarding any of a handset, camera, monitor and keyboard. Additionally, a structure including a transparent or opaque layer and a lighting component can be employed with any computing device or peripheral in the computing system to convey a lighting scheme to a user based upon a state of or notification in the computing system. One can appreciate that many other aspects of an improved computing ecosystem are also described below.

In various embodiments of the invention, the invention provides methods for communicating alternate states or conditions of the pc and/or its systems/subsystems to the user and/or other people within viewing range via a notification light embedded in a computer or computer peripheral product. For example, a light emanating from a computer monitor bezel can be lit when the PC is in standby mode, communicating to a user that the pc is ready for use. When the PC is turned on or placed into use, the light may diminish from around the monitor and emanates from the base of or near the CPU, indicating that processing and computing activity has been engaged and that the PC is on. This same light source can be used to communicate alternative states of PC use or activity including, for instance, but not limited to a do not disturb state, a system state, or a system health characteristic.

With respect to a "Do Not Disturb" state, in this condition, the light emanating from the CPU can work in unison with a "Do not disturb" control, e.g., located on the keyboard or monitor, to indicate a shift in the way the computer is being used. The user engages a Do not disturb control to shift the state of the PC. An example would be pressing a unique Do not disturb button. The button could glow Amber (or other color) and the light emanating from the CPU would glow similarly giving both the user and people around the user the indication that the computer is now in a different use state. In this regard, the do not disturb state can automatically direct incoming voice calls to a voice mail inbox, instant messaging (IM) applications would indicate that the user is unavailable for IM discussions. Email might send an auto reply that would indicate unavailability all of which allowing the user the ability to focus on tasks or work free from unwanted interruptions. This mode could be configured by the user where certain people would be allowed through to reach the user, e.g., the person's Manager, key team members, spouse or family members, etc. and under which circumstances.

With respect to a system alert, in this condition, the light emanating from the CPU works in unison with the PC and its activity, notifying the users of various kinds of alerts. These alerts could manifest in the following non-limiting ways: Printer out of paper or jammed, Connection interrupted, Software updates are available, User specified alerts, etc. The user can configure when, how and under what circumstances such alerts would occur.

With respect to system health, the light emanating from the CPU works in unison with the PC and its activity. This would notify the users of the general health of the PC whereby people can discover when the PC is functioning optimally. The light or indicator could give the user a more general awareness of the performance of the PC. Examples might include: Memory is full, Processor is slowing down, a Virus or bug in the hardware or software is affecting performance, Disc needs defragmentation, whether the user should enable or disable macros, System is working at its optimum performance capability, etc. The user can configure when, how and under what circumstances such health notifications would occur.

With respect to system behavior, the behavior of the light including the color, intensity, brightness, any associations to sounds and lighting effects could be controlled through software and/or the user preferences. Examples include RGB based lighting component(s) allowing it to perform according to different user profiles, applications and preferences. The behavior of the light may include pulsing, blinking rate, wherein frequency and intensity are programmable. Sounds could be associated with different state events as well.

Figure 7B:
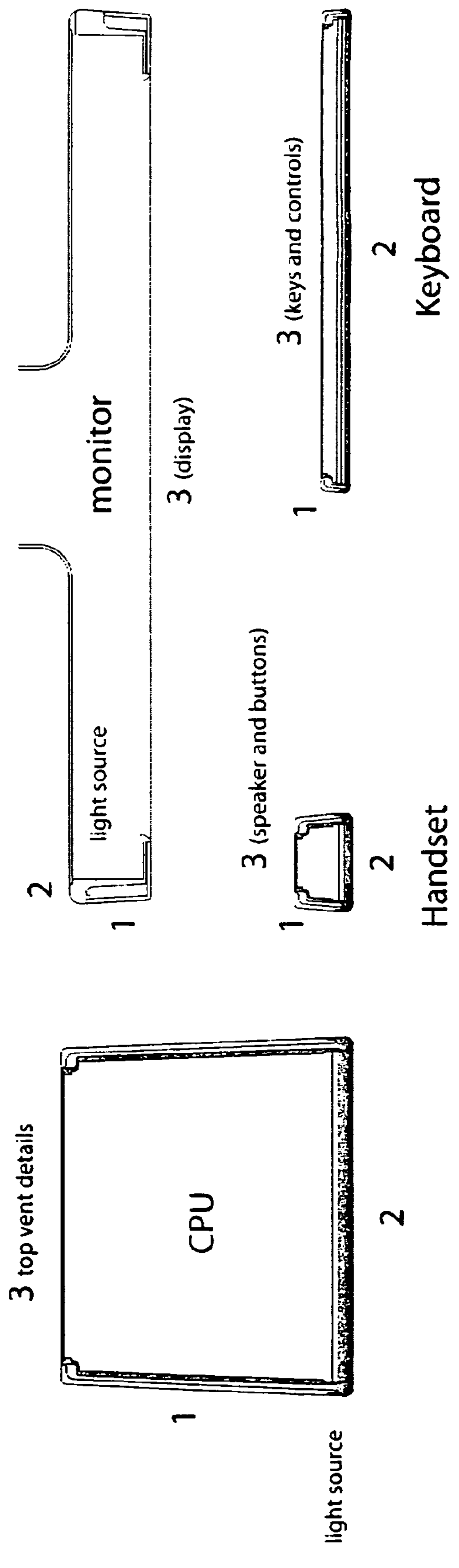

FIGS. 7A and 7B illustrate various structure(s) that can be incorporated into various computing devices and peripherals to achieve the glow or lighting scheme referred to above. For instance, as illustrated in FIG. 7A, such a device or peripheral could include a translucent or clear outer shell/skin/layer ($1^{st}$ layer) that allows an observer to see the material underneath, and which serves as a lens or material capable of diffusing light transmitted from another area, such as the base. A core material layer ($2^{nd}$ layer) is visible at the other area, such as the base, which extends to the top or front of the device or peripheral. This creates a visual effect that grounds the product as a solid mass. This other area, such as a base, includes a "reveal" area where light can be transmitted. A third material ($3^{rd}$ layer) for such a structure includes a top or front area used to emphasize or showcase key interaction features to a user, where present, such as a display of a monitor, buttons of a keyboard, speakers, vent details, etc. FIG. 7B illustrates that such a structure can be implemented in a variety of computing devices and peripherals, to provide a unified PC lighting scheme, whereby all of the devices and peripherals sharing the lighting structure of the invention can emanate light according to a similar state or theme. Such devices and peripherals include a CPU box, a monitor or display, a handset, a keyboard, a mouse, etc. Exemplary non-limiting positions for the $1^{st}$, $2^{nd}$ and $3^{rd}$ layers are marked accordingly.

In other embodiments of the invention, a monitor stand is provided which behaves as both a charge point for various wireless devices and peripherals and a data synchronization point where appropriate. In this regard, the powered monitor stand of the invention is used as a central point for synchronizing PC peripheral products. This stand can also be used to recharge the batteries in these devices while/after docking with stand. Products that could be synchronized/recharged in this manner include but are not limited to: wireless mice, wireless keyboards, wireless video cameras, wireless telephone handsets, wireless computer monitor with integrated microphones and speakers, wireless speakers, cellular handsets, wireless pens, smart phones, PDAs (e.g., Pocket PC), Tablet PCs or Laptop PCs, wireless monitors or smart displays.

The problem existing today is that a user is unable to effectively synchronize a variety of devices in one location, i.e., today's synchronization is ad hoc per device. Thus, synchronization in accordance with the invention includes the ability to update common information that can be independently changed or modified from any of the devices available to the user. Upon synchronization, all associated products are updated with most recent and updated information regarding contacts, appointments, messages, mail, etc. This includes system settings and notifications as well. Incorporating docking or connectivity into a single monitor stand allows the user to access, dock and undock devices within an optimum location on a desktop.

Figure 9:
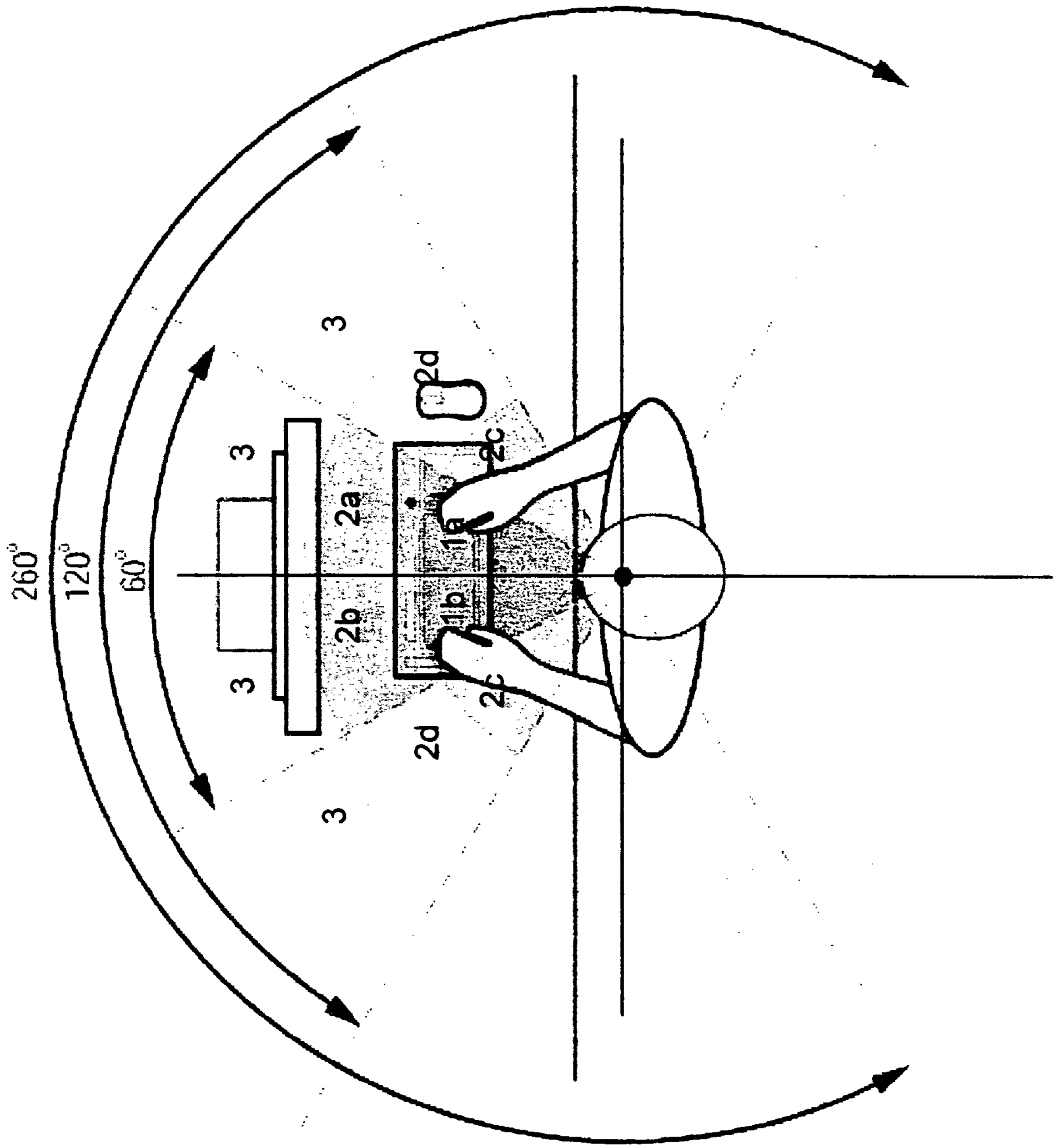
FIG. 9 illustrates various zones from a user standpoint in accordance with interaction with a computing environment.

FIG. 9 illustrates this optimum arrangement. In FIG. 9, Zone 1a is the Primary work zone, right side, Zone 1b is the Primary work zone, left side, Zone 2a is the Secondary work zone, center right side, Zone 2b is the Secondary work zone, center left side, Zone 2c is the Secondary work zone, outer right side, Zone 2d is the Secondary work zone, outer left side and Zone 3 is the Tertiary work zone. In this regard, the Primary work zone is the location for tasks requiring fine motor control, or close inspection, and/or which are very frequent or highly important. The Secondary work zone is the location for tasks requiring gross motor movement, manipulation and/or are either important or relatively frequent in occurrence. The Tertiary work zone is the location for infrequently performed tasks or actions.

The integration of power into the stand also allows for the wireless battery powered products to recharge when docked into the system.

In some embodiments of the invention, a configuration includes aligning the handset on the left side of the PC giving the user an advantage of grasping and holding the handset with the left hand while using a pointing device or writing device with the right hand. The motive behind allowing the user a bi-manual control of the PC is to give a simple, seamless opportunity to use multiple hardware devices within a software application, yielding a more productive and less complex interaction with software and hardware.

Additionally, the camera has been positioned on the side of the computer allowing for a direct line-of-site viewing and use of the camera while in a video conference mode. The alignment of the software optimally orients with this system in the UI. The caller ID display that is part of the telephone handset is aligned along this same horizontal viewing plane allowing for optimal line of sight and visibility.

Figure 2A:
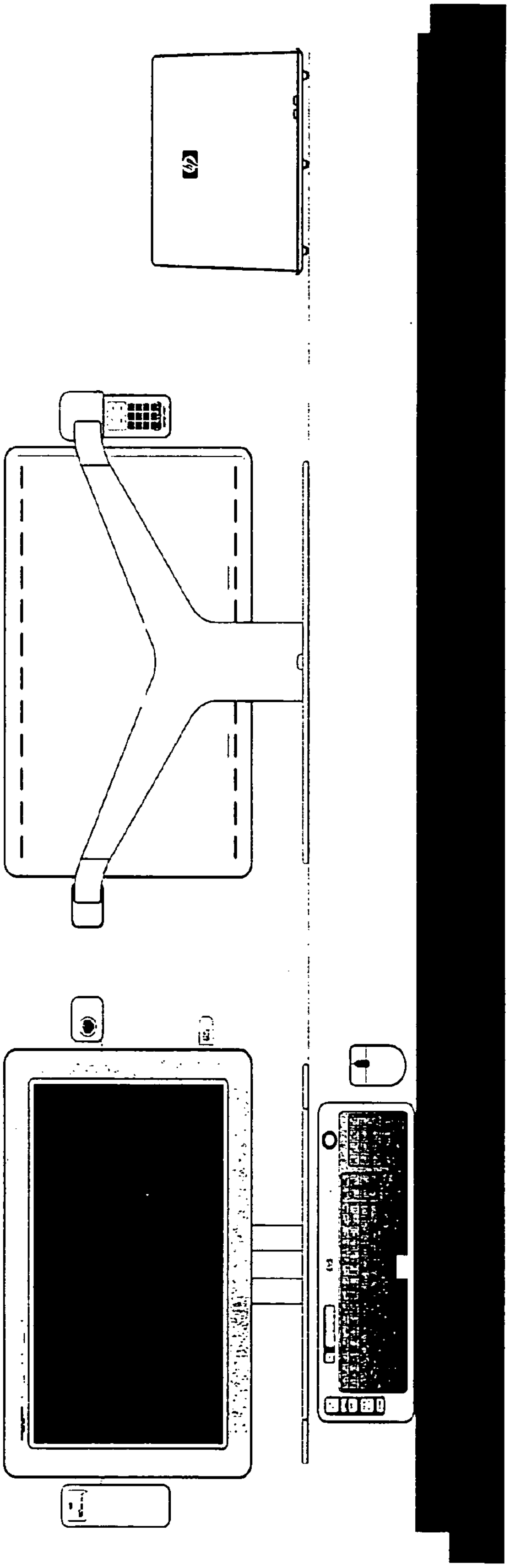
FIGS. 2A to 6E are views of a stand and associated devices and peripherals illustrating exemplary non-limiting structure (s) for various designs in accordance with the invention.
Figure 2B:
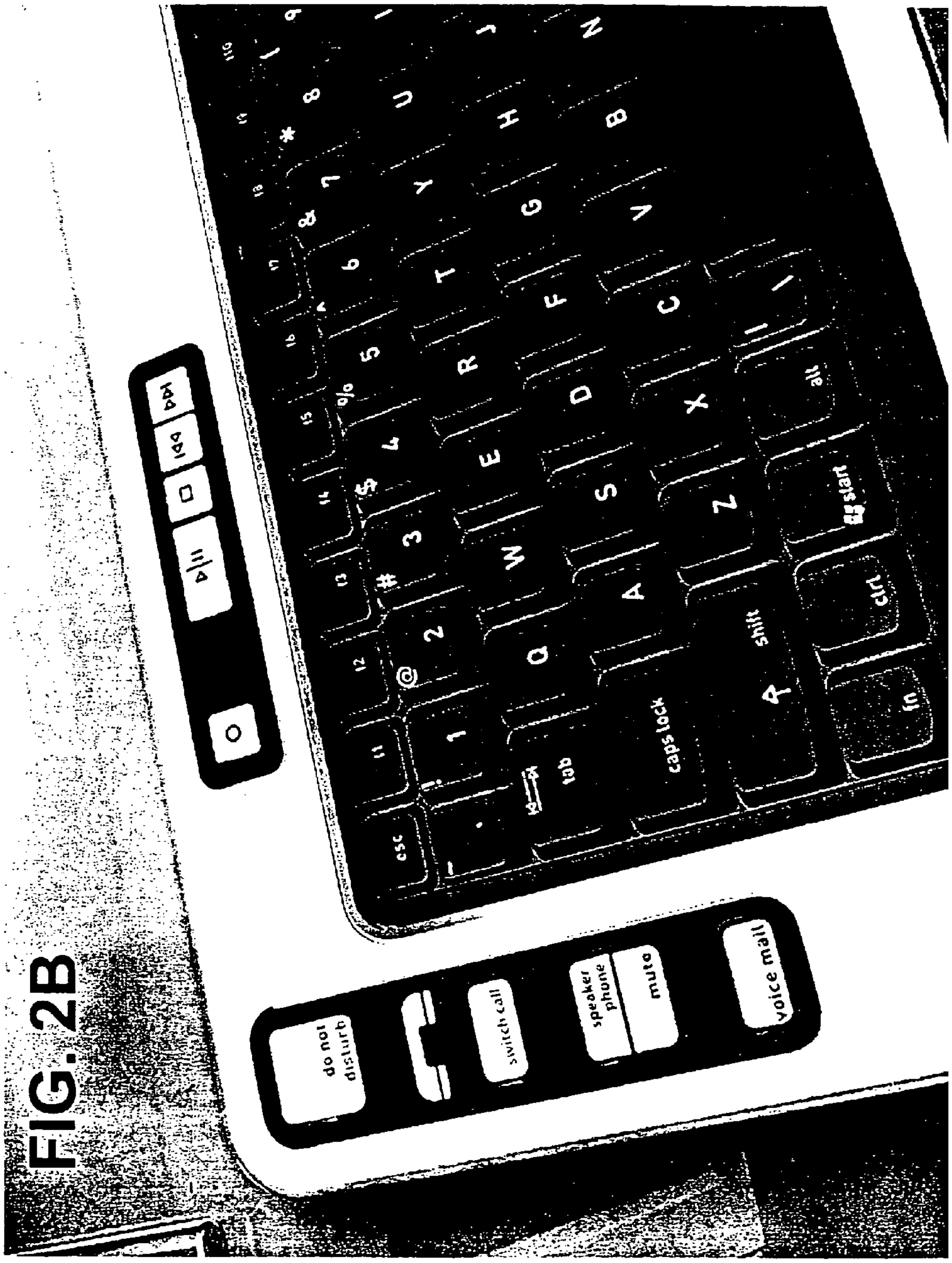
Figure 10:
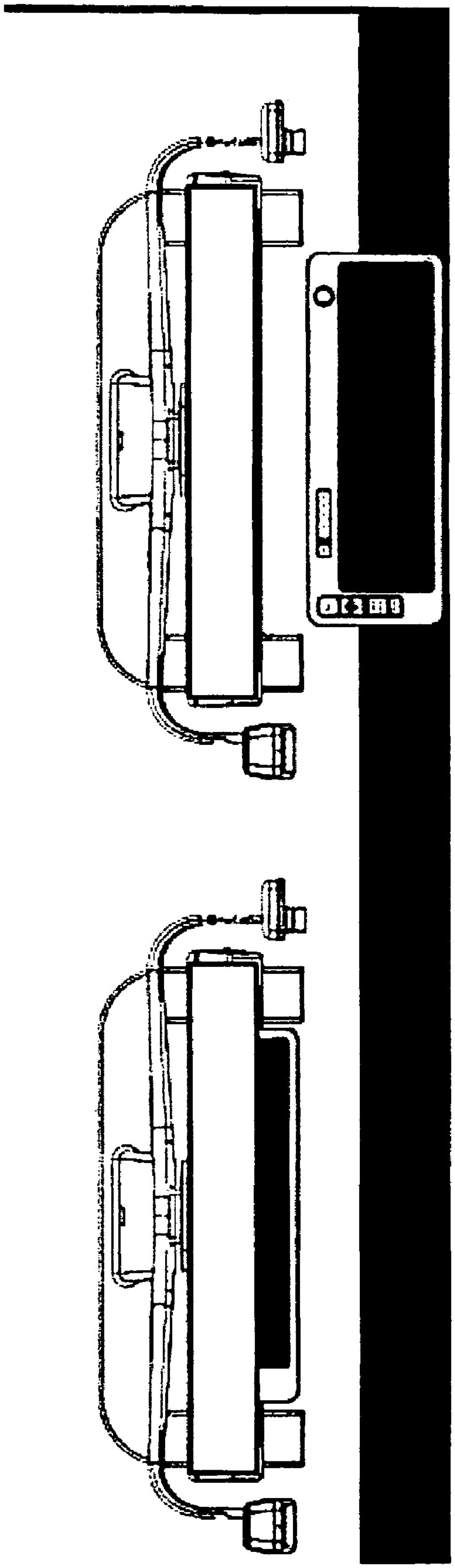
FIG. 10 illustrates a keyboard in undocked and docked states in accordance with an aspect of the invention.

In other embodiments of the invention, a powered monitor stand is provided that is designed to accommodate the docking and recharging of a computer keyboard. The shape of the stand has an open area at the base of the feet that accommodate the keyboard when docked for charging. The design of the base allows for the user to simply slide the keyboard into place and quickly remove for immediate access and kick docking/undocking. The unique area at the base of the stand visually ties into the shape of the keyboard and allows for a simple integrated method of recharging the keyboard. FIG. 10 illustrates a top view of an exemplary configuration wherein the keyboard is docked and undocked. When docked, the wireless keyboard can recharge. FIG. 2B illustrates an up close view of an exemplary keyboard in accordance with the invention. One can see that buttons are included that take away the difficulty of previously complex software operations by providing a button that achieves such functionality directly across a variety of platforms, and applications. For example, any of a “do not disturb” button, switch call button, a speaker phone button, a mute button, a voice mail button, a power media player button, a play/pause media button, a stop media button, a fast forward/skip forward button, a rewind/skip backwards button can be provided. Other buttons that can be included on the keyboard include a power button or a volume button. All of these buttons empower a user, and improve the usability of the overall computing experience.

Figure 8A:
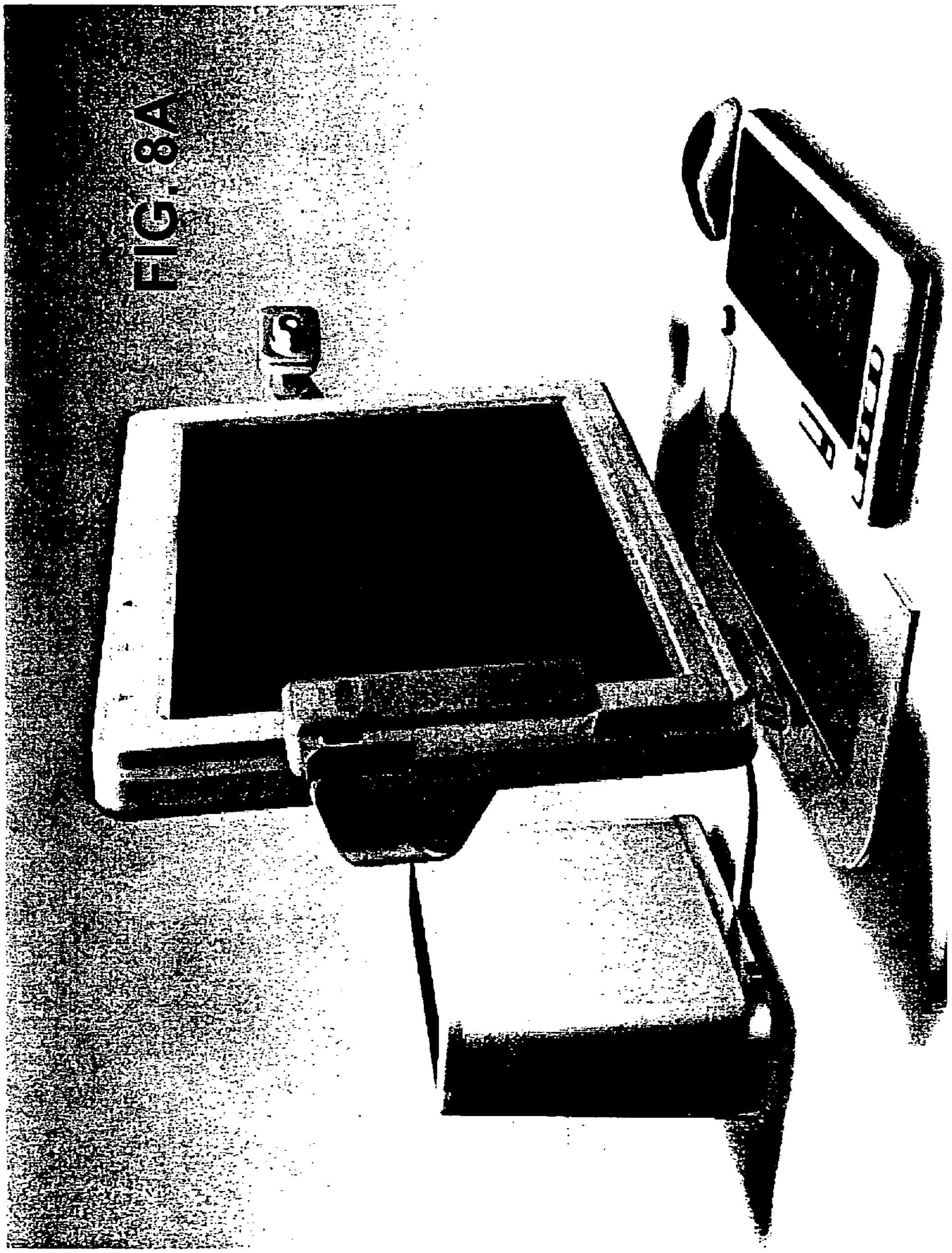
FIGS. 8A to 8L illustrate various structural and functional advantages enabled by the present invention for the provision of an improved computing ecosystem.
Figure 8B:
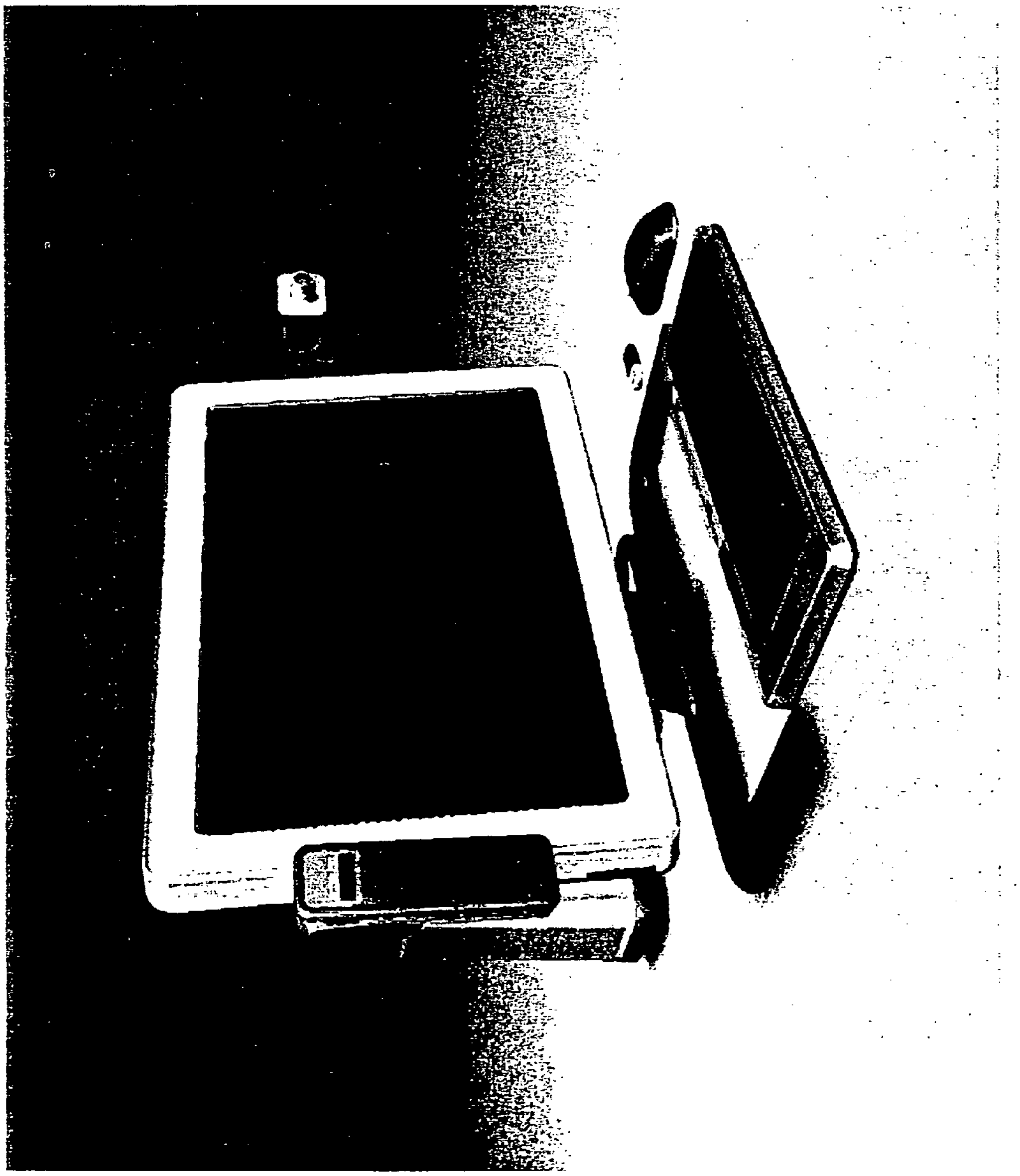
Figure 8C:
Figure 8D:
Figure 8E:
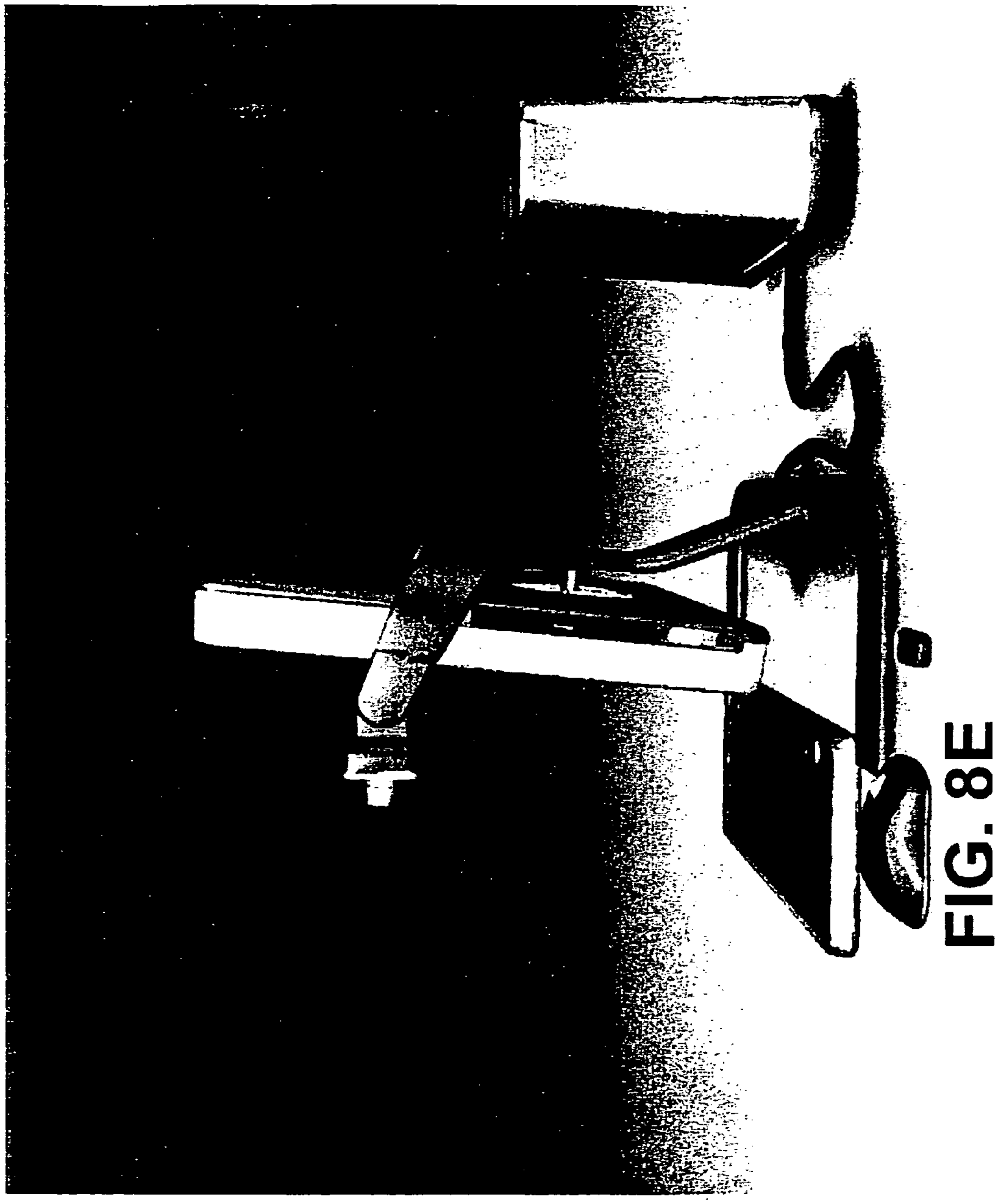
Figure 8F:
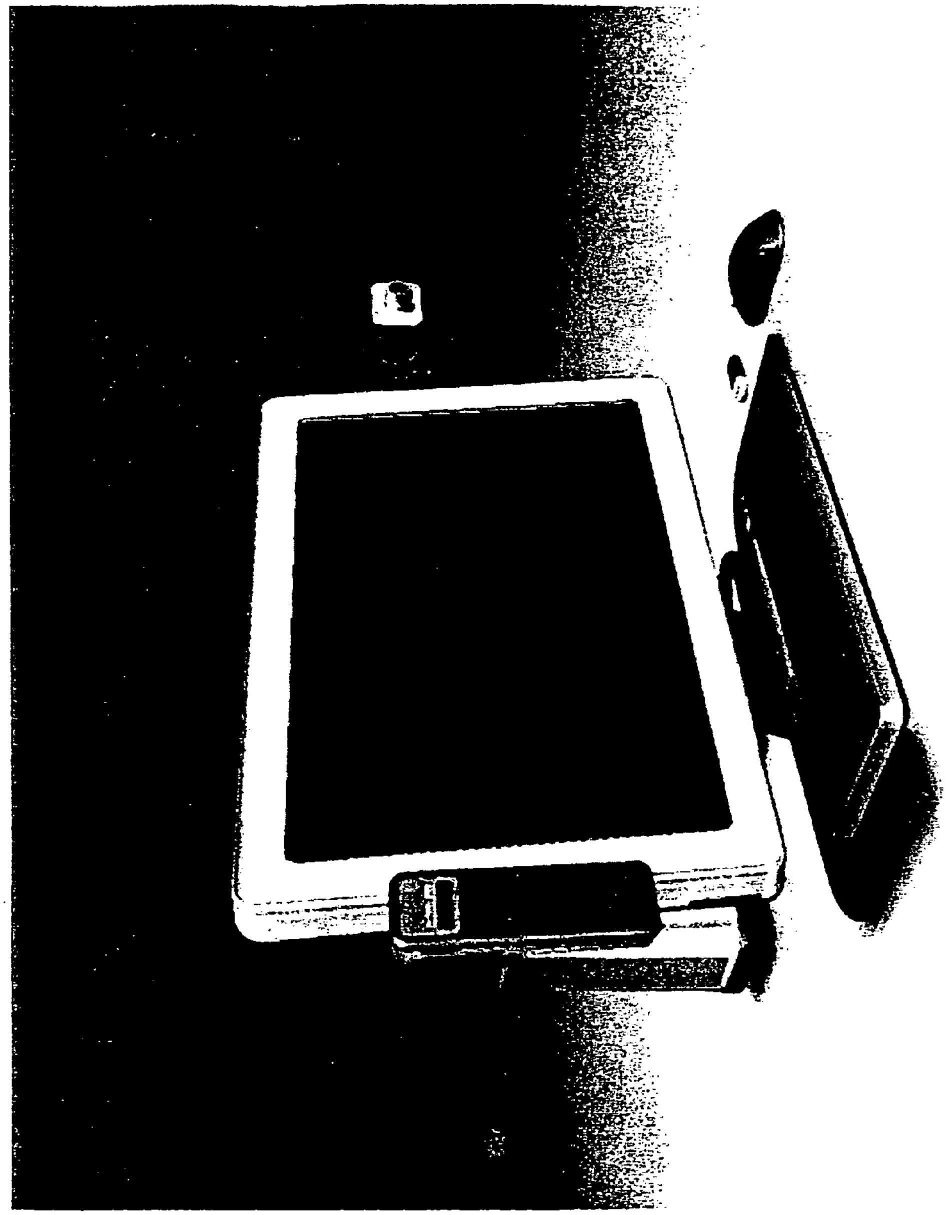
Figure 8G:
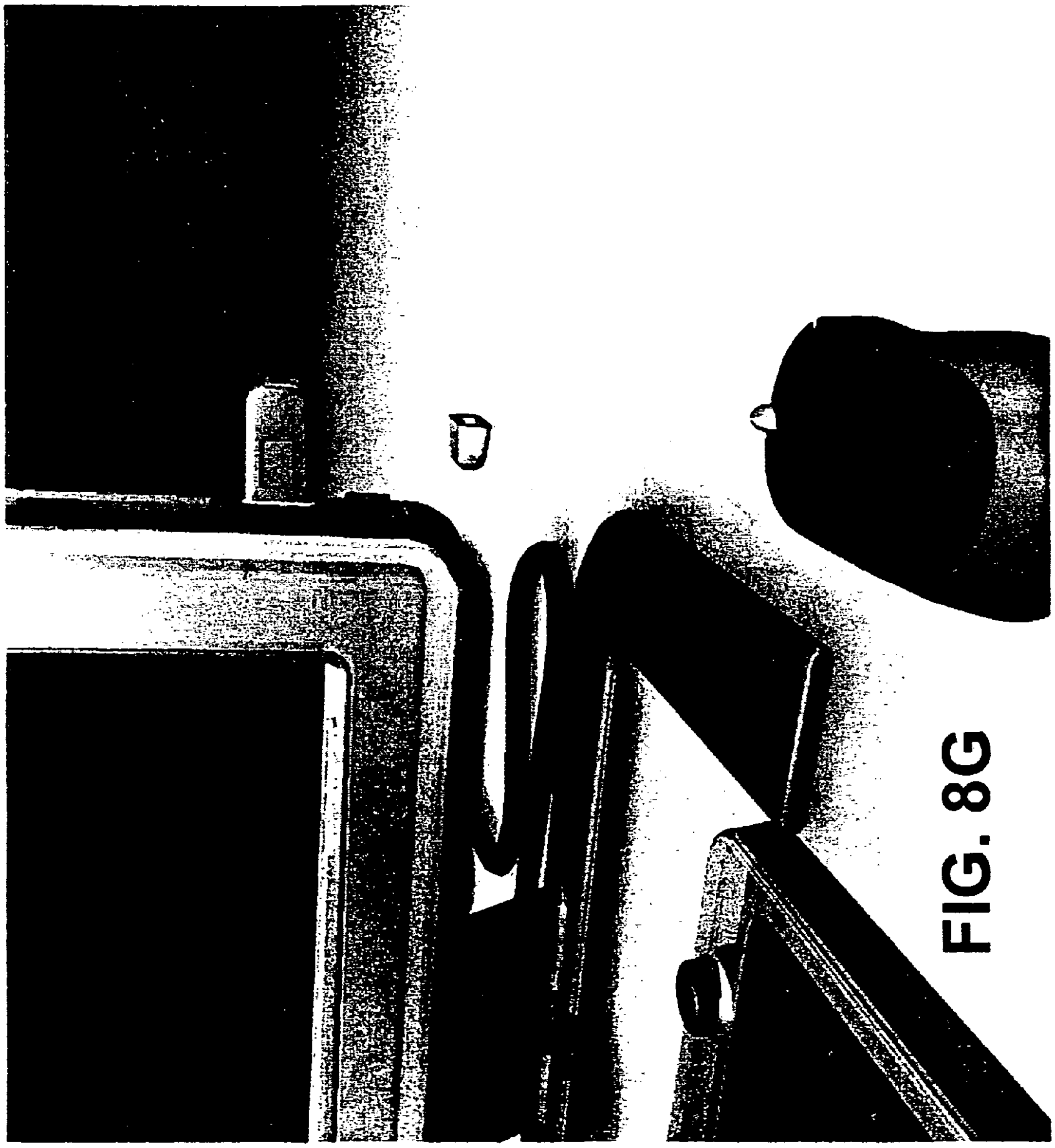
Figure 8H:
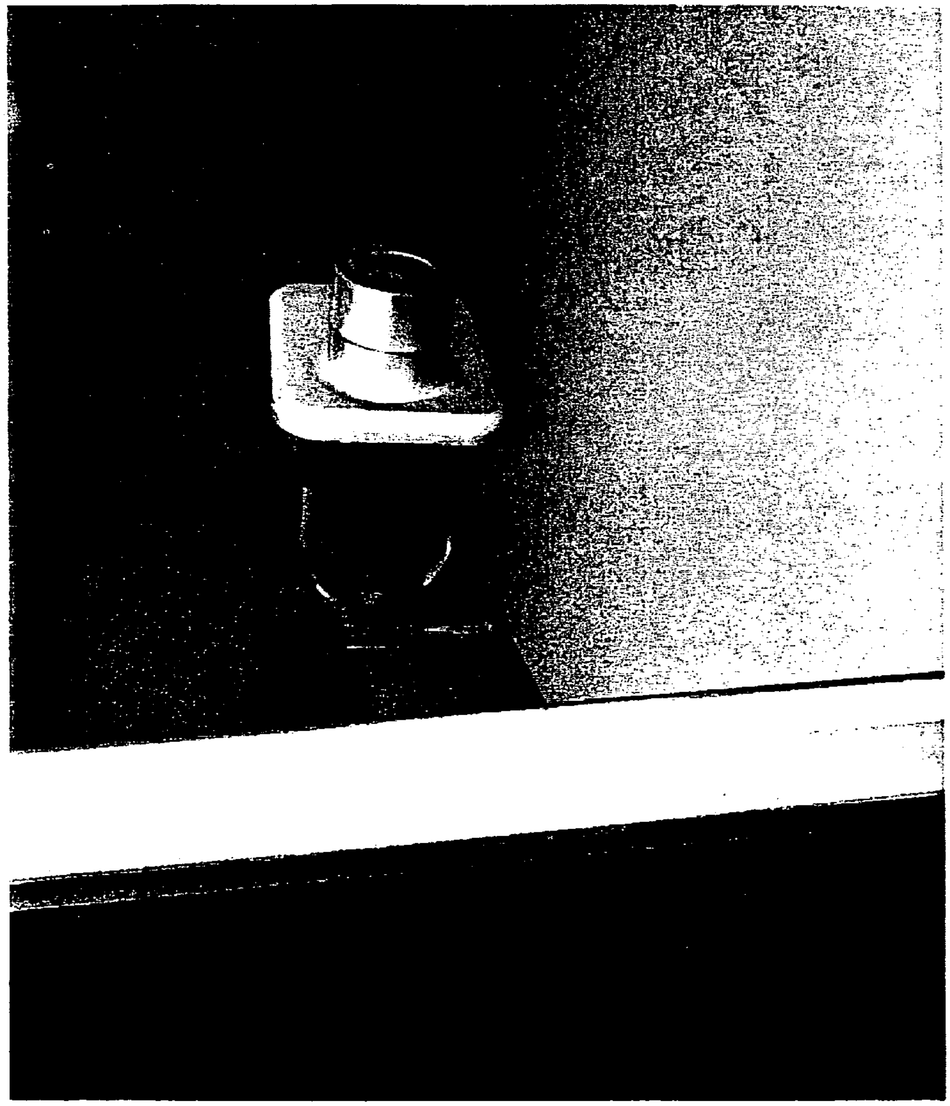
Figure 8I:
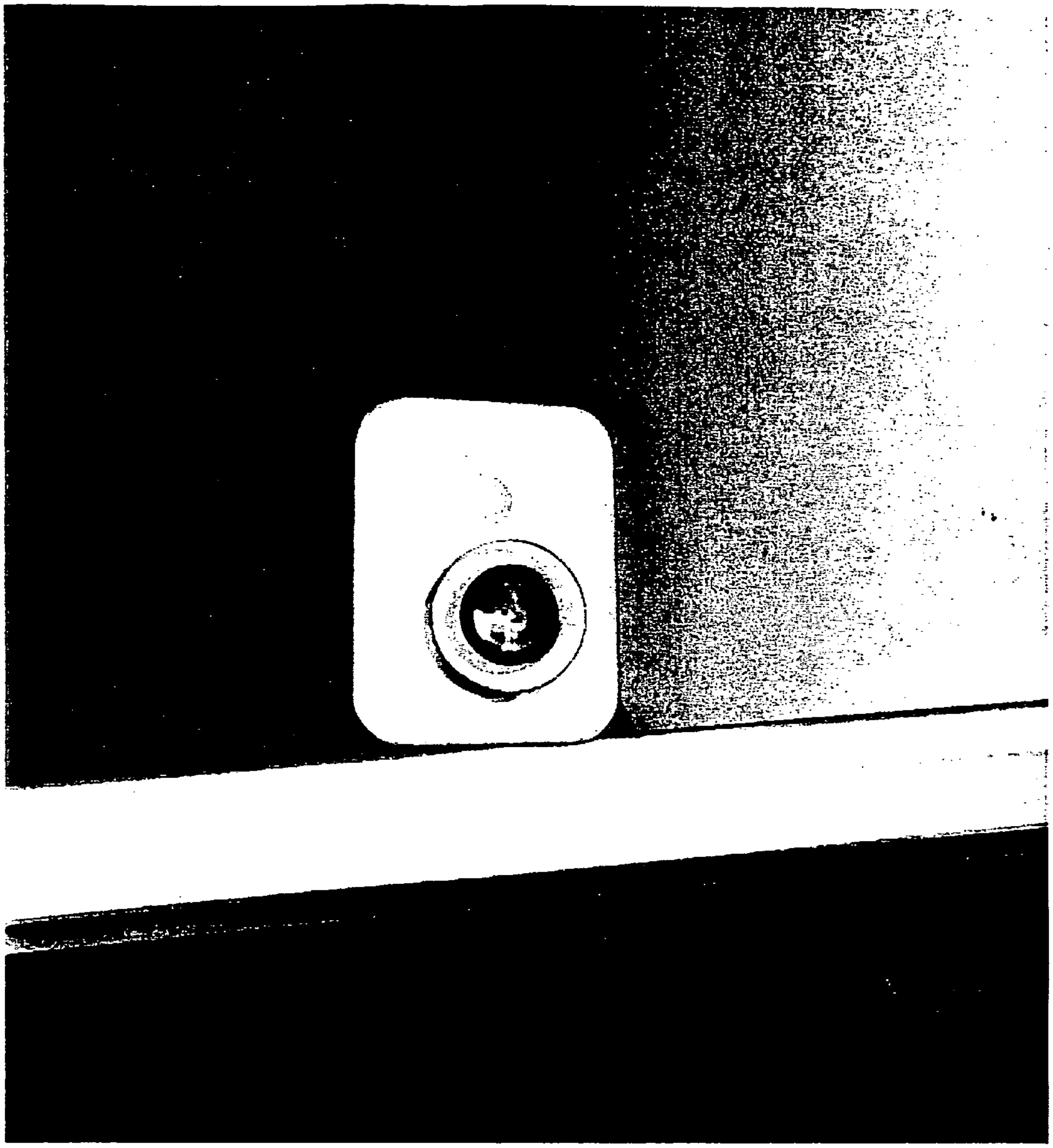
Figure 8J:
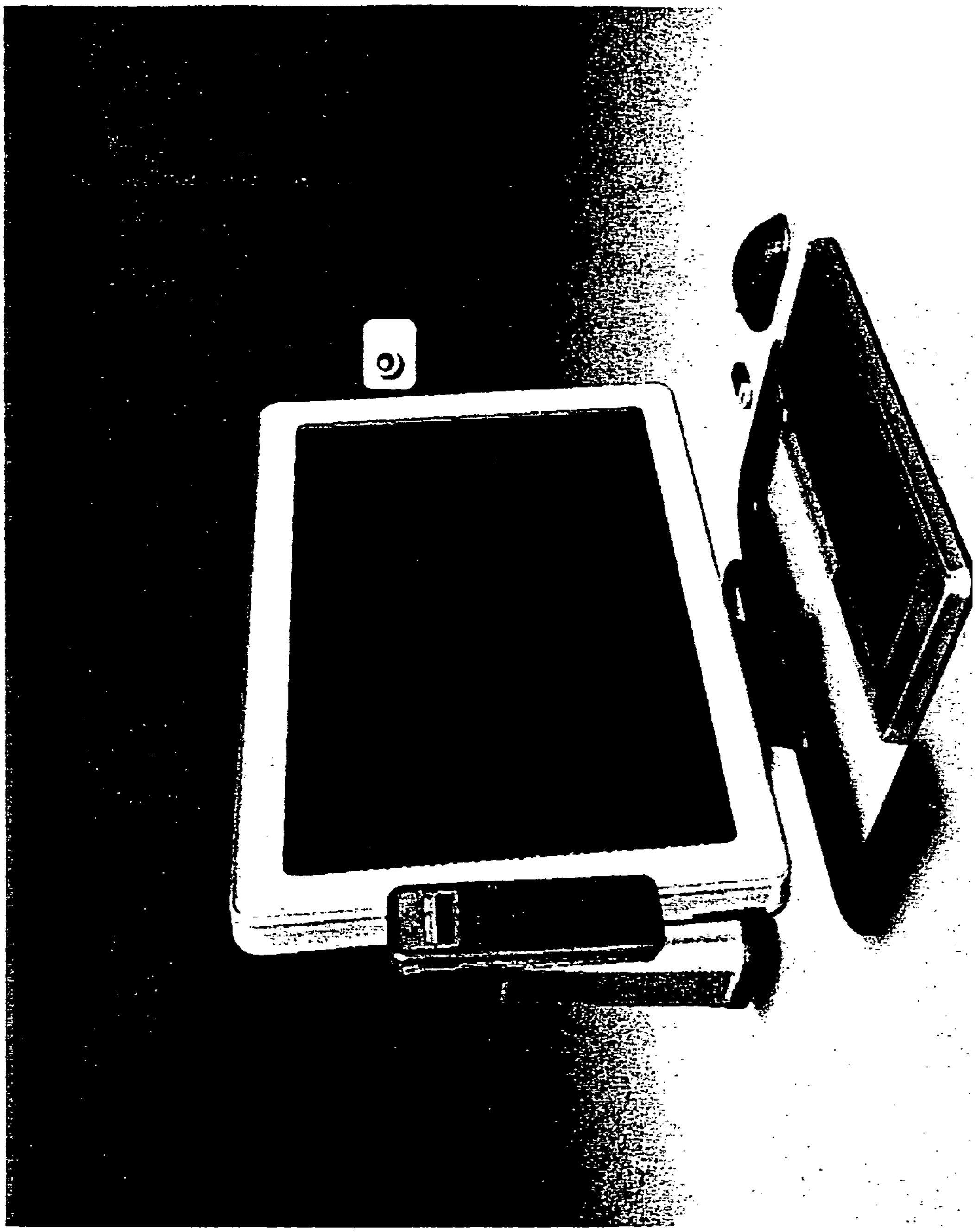
Figure 8K:
Figure 8L:
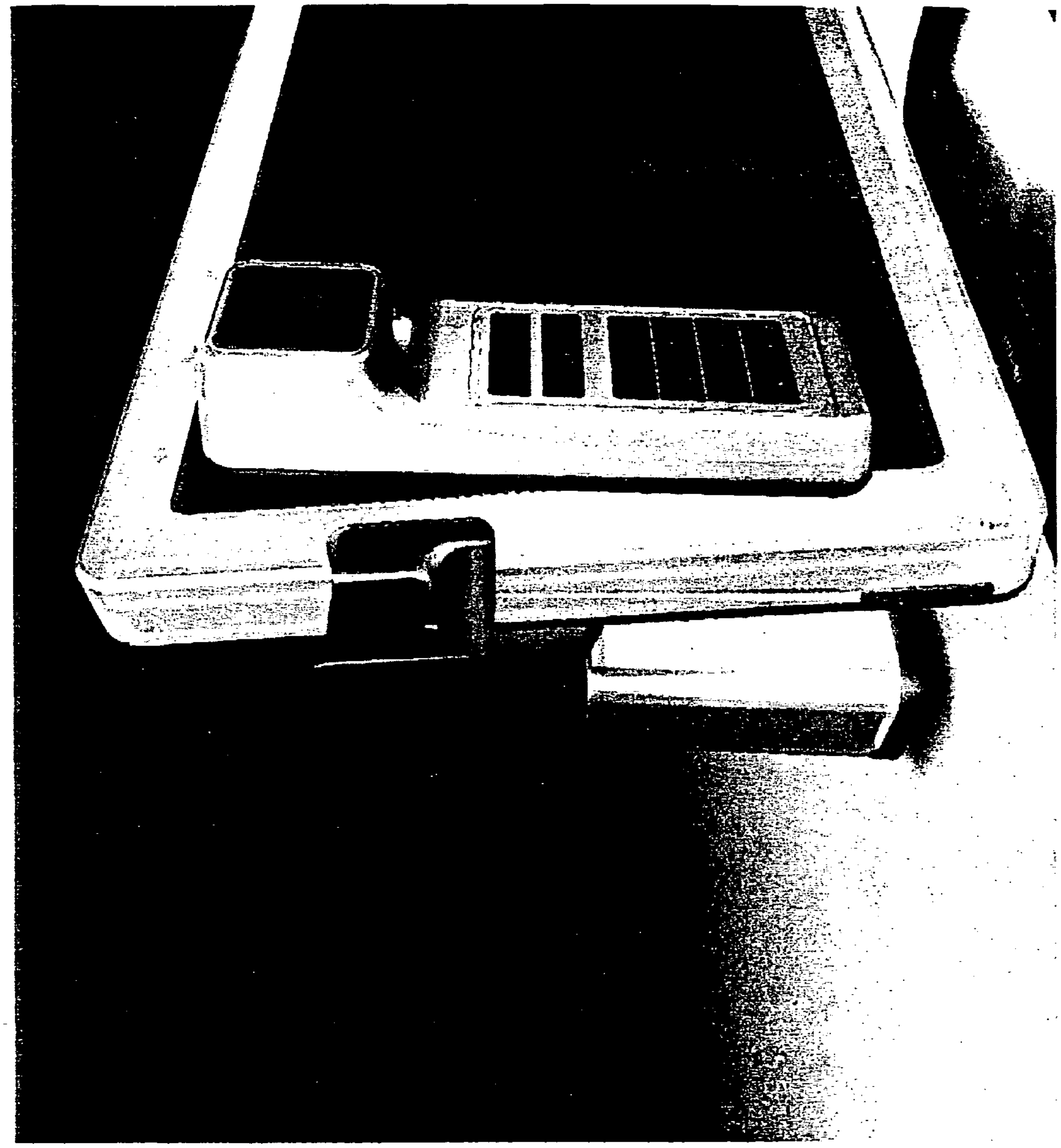

FIGS. 8A to 8L illustrate various views of a monitor stand that integrates a handset, a camera, a monitor and a keyboard, including aspects described above. Of particular note, the handset, camera and monitor are independently pivotable. In FIG. 8G, a USB or other connected device can be included in such a system. Such device might be a storage device, or biometric device. FIGS. 8H to 8J illustrate a smart camera that can pivot and behave in accordance with a user’s activity. FIGS. 8K to 8L illustrate a smart detachable handset that can have its own auxiliary display for showing information and notifications to a user. FIG. 2A illustrates an exemplary two dimensional view of a such system.

Figure 3A:
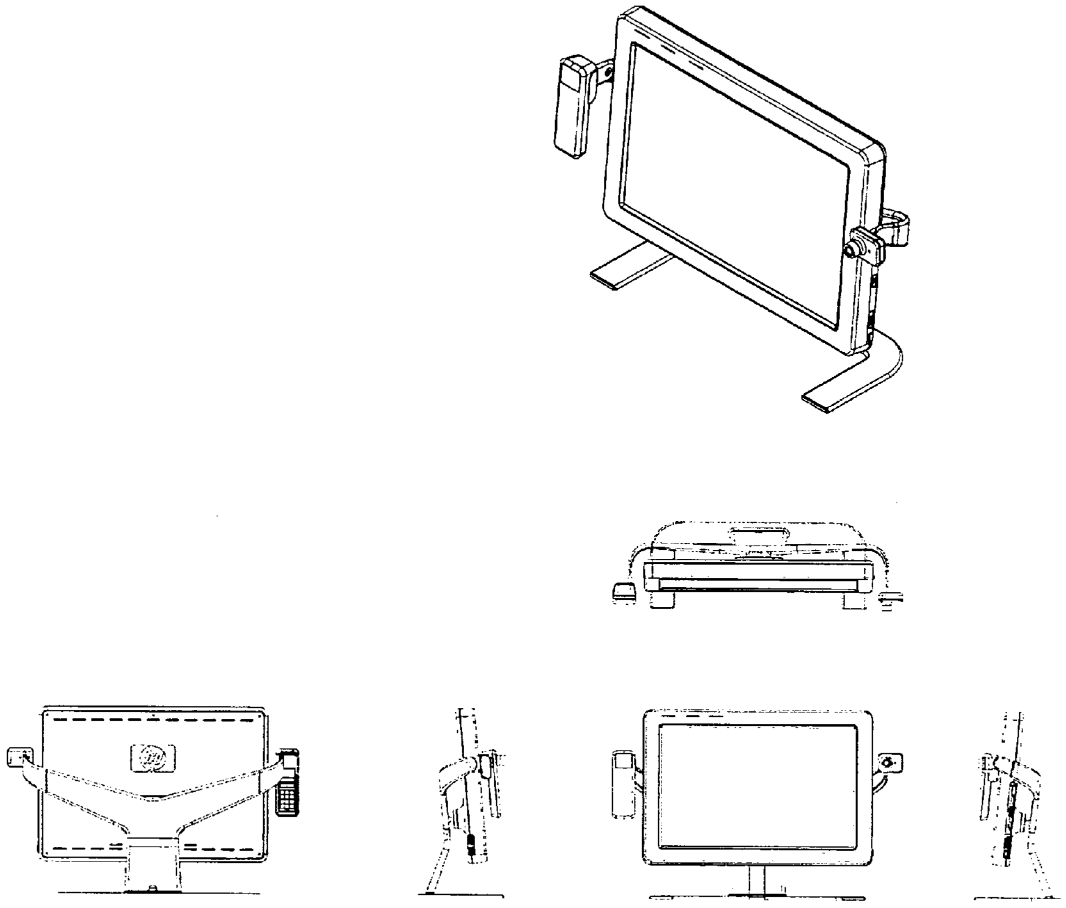
Figure 3C:
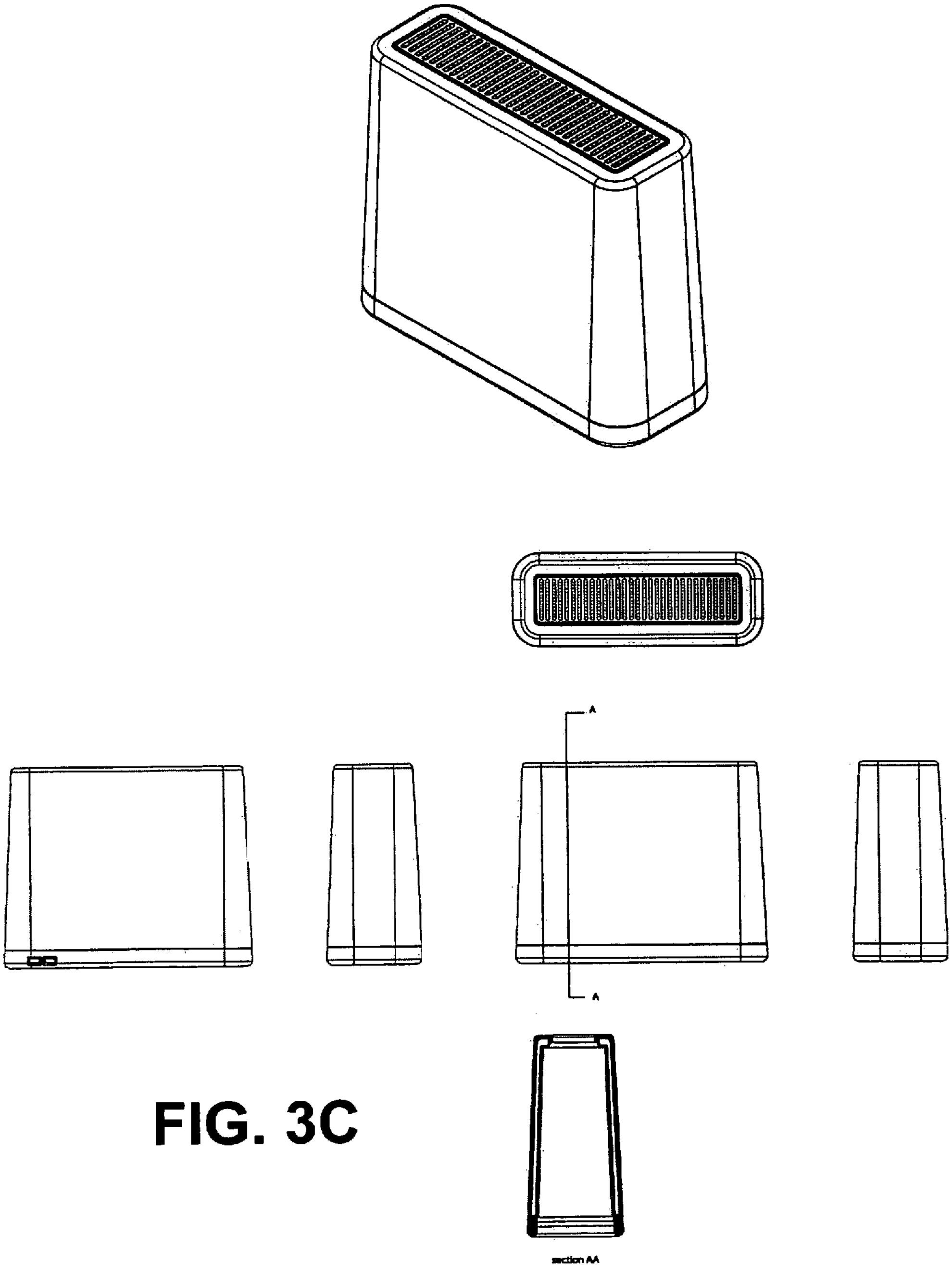
Figure 4A:
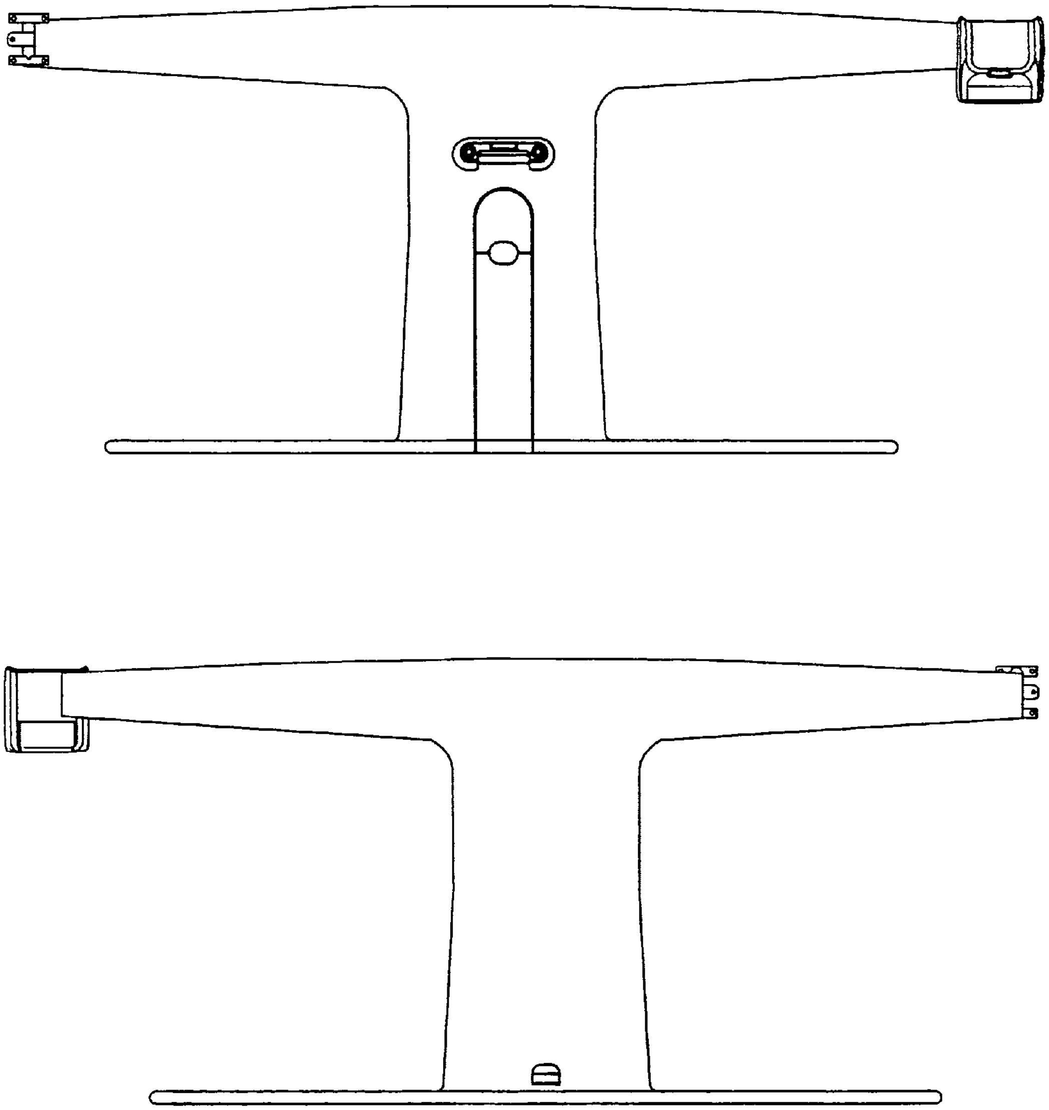
Figure 4B:
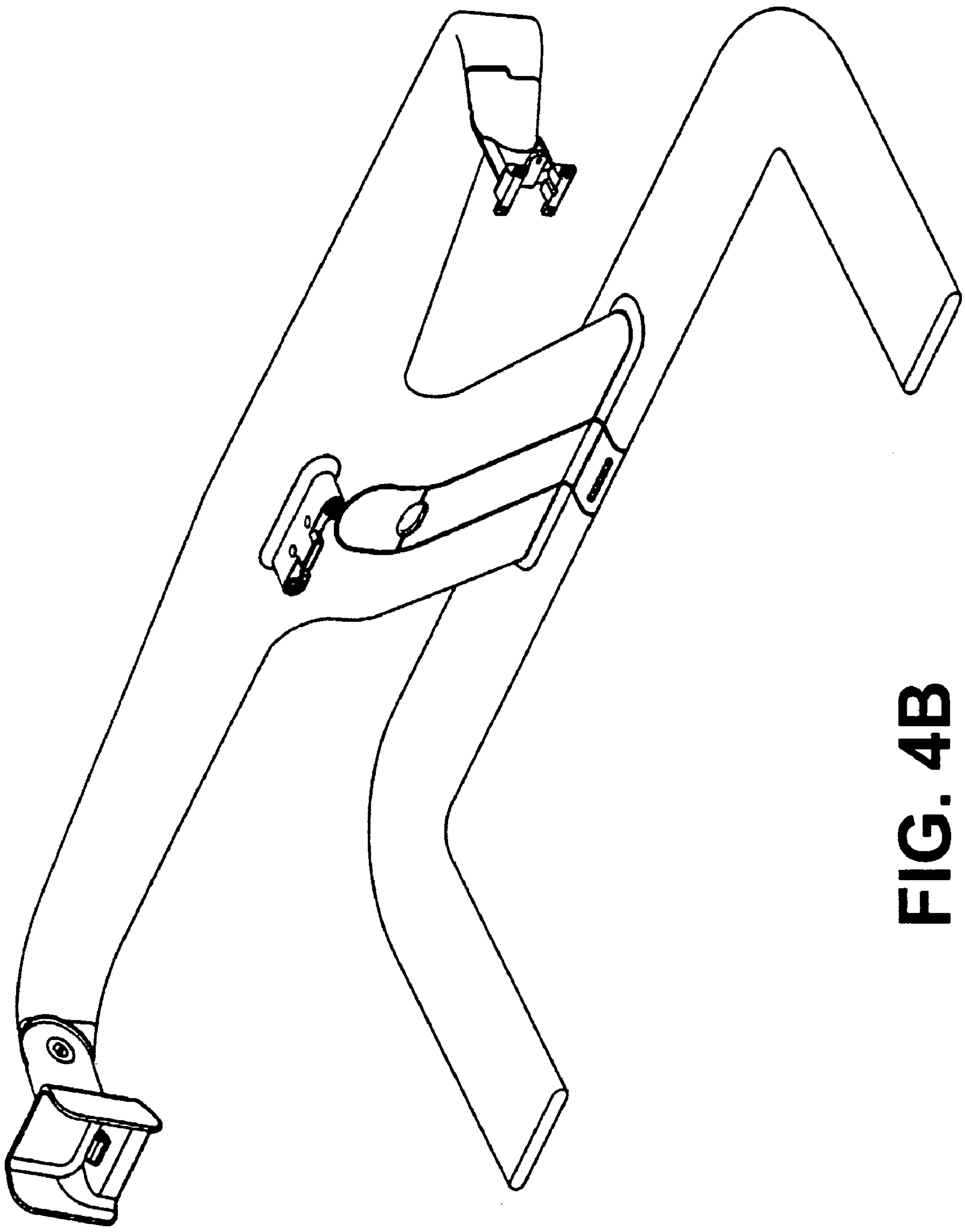
Figure 4C:
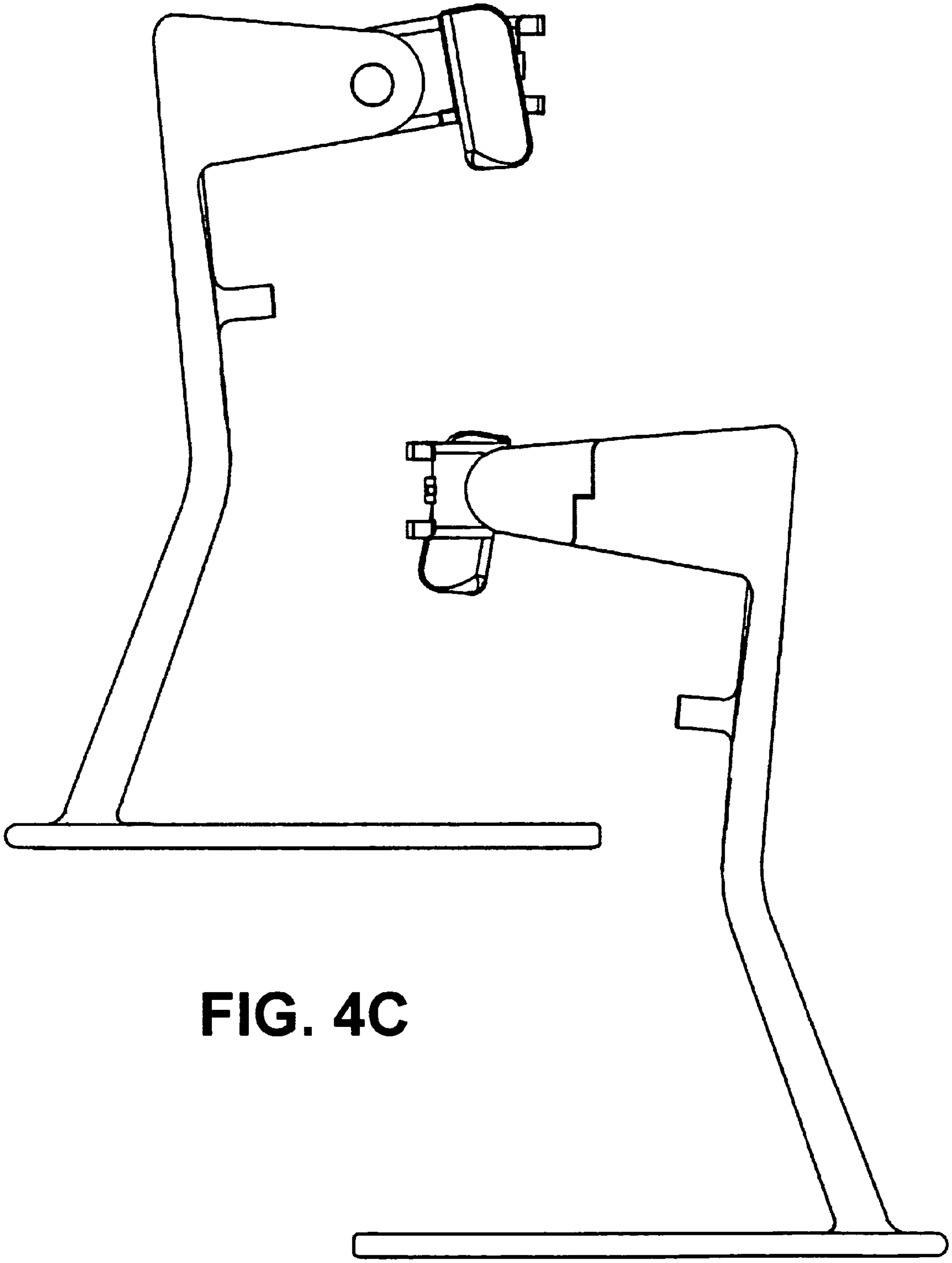
Figure 4D:
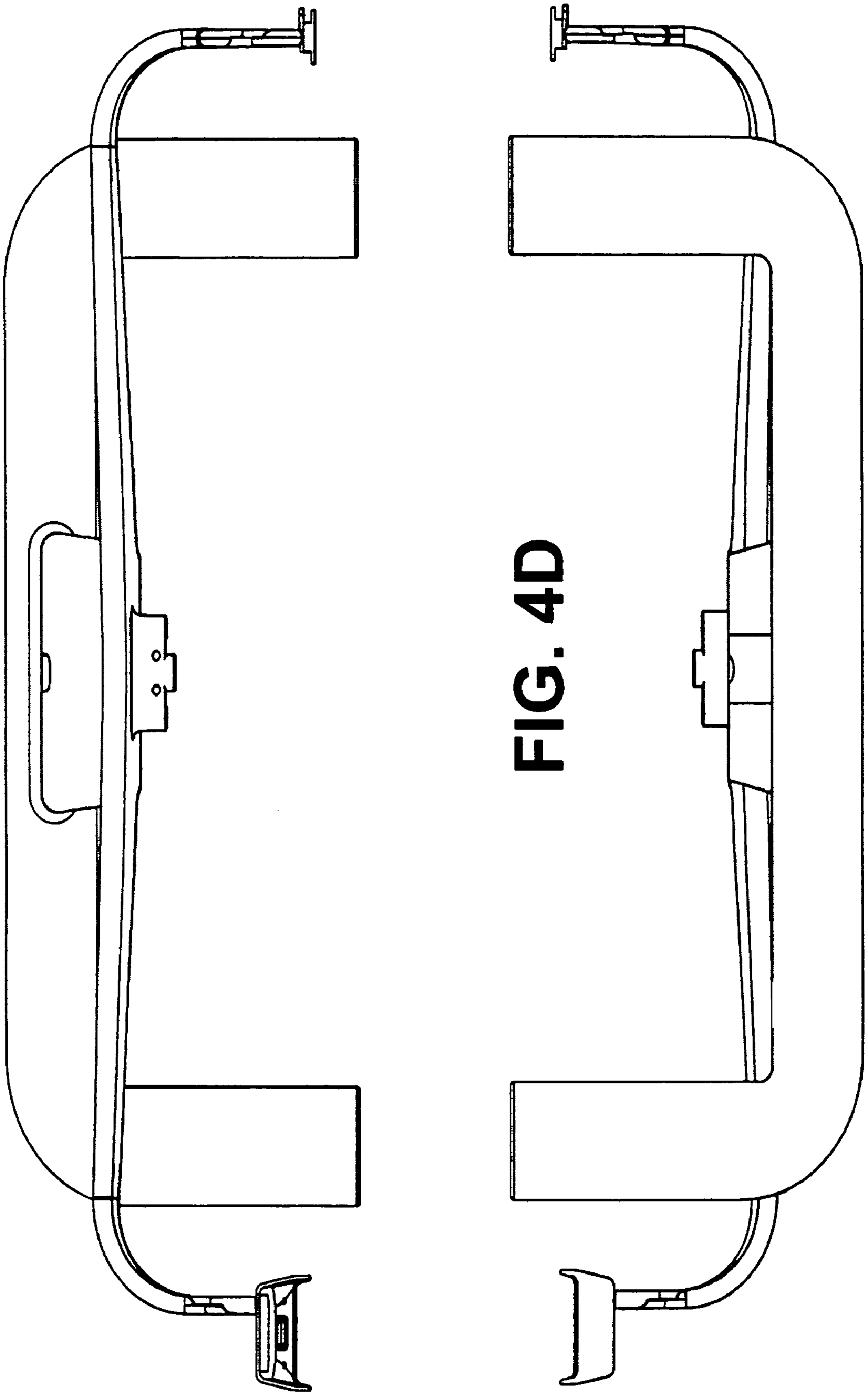
Figure 5A:
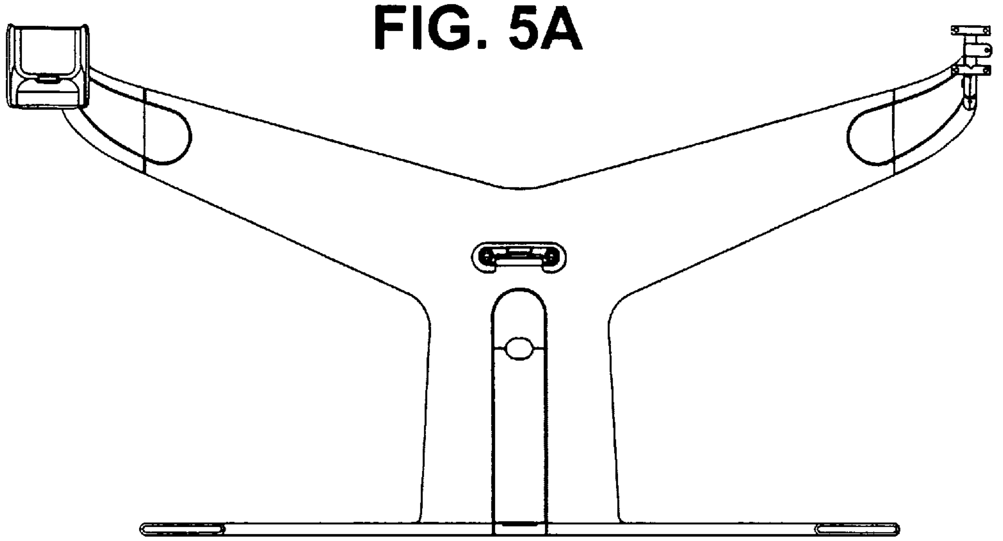
Figure 5A:
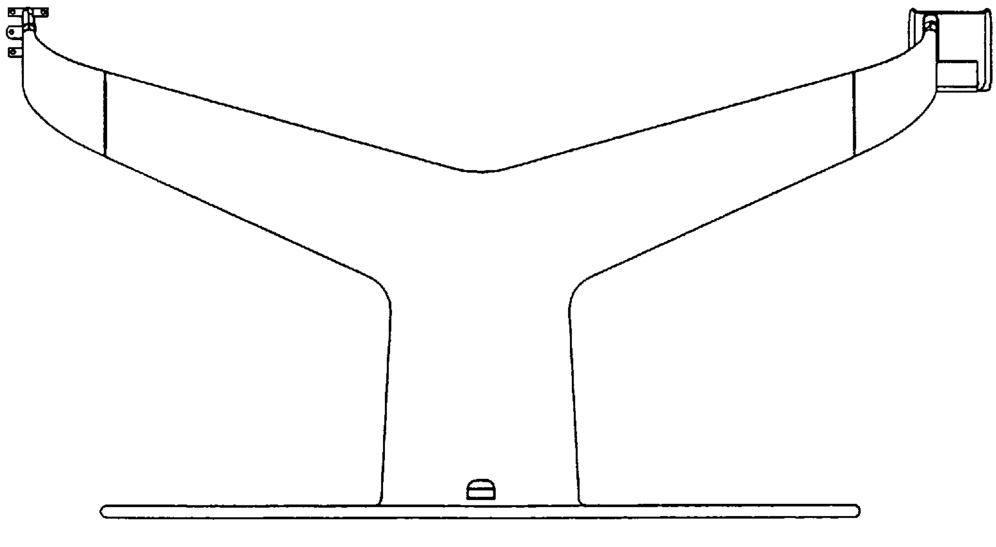
Figure 5B:
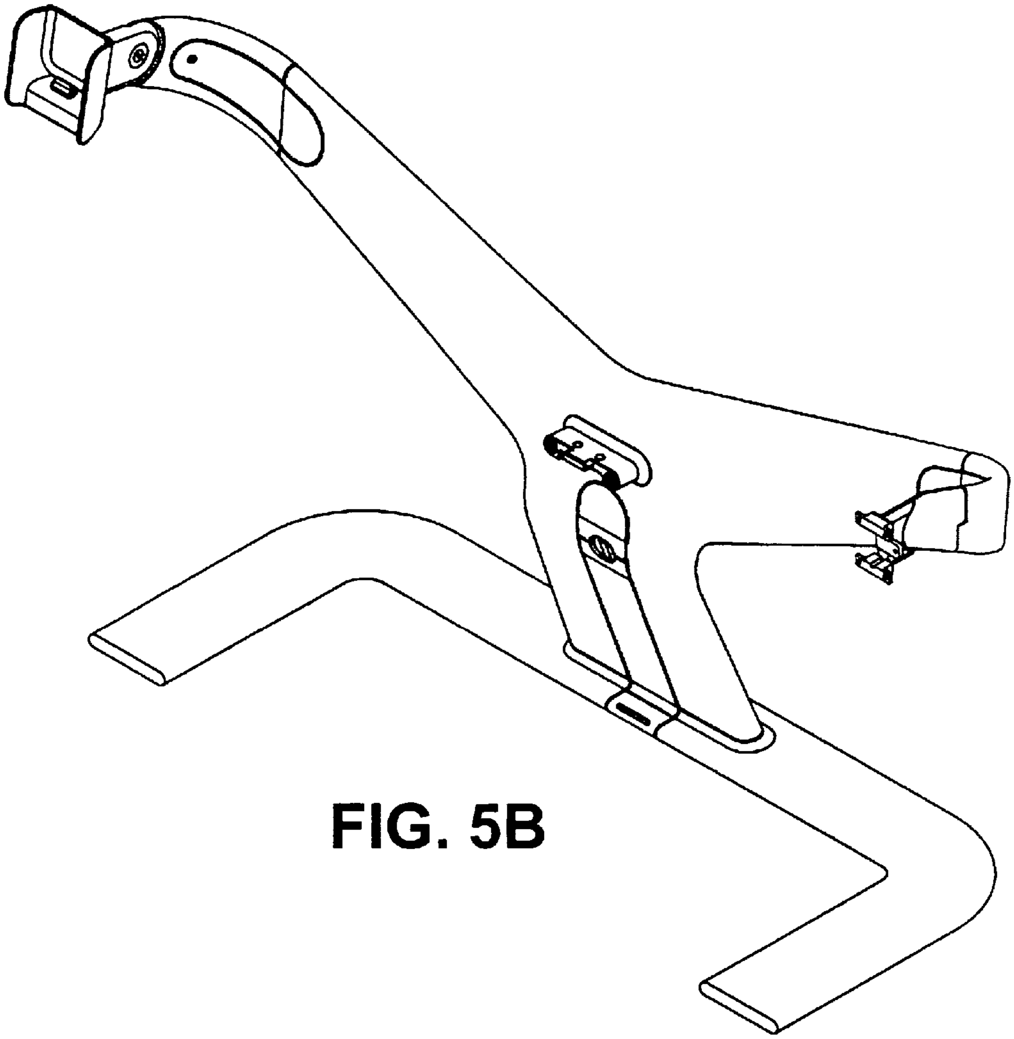
Figure 5C:
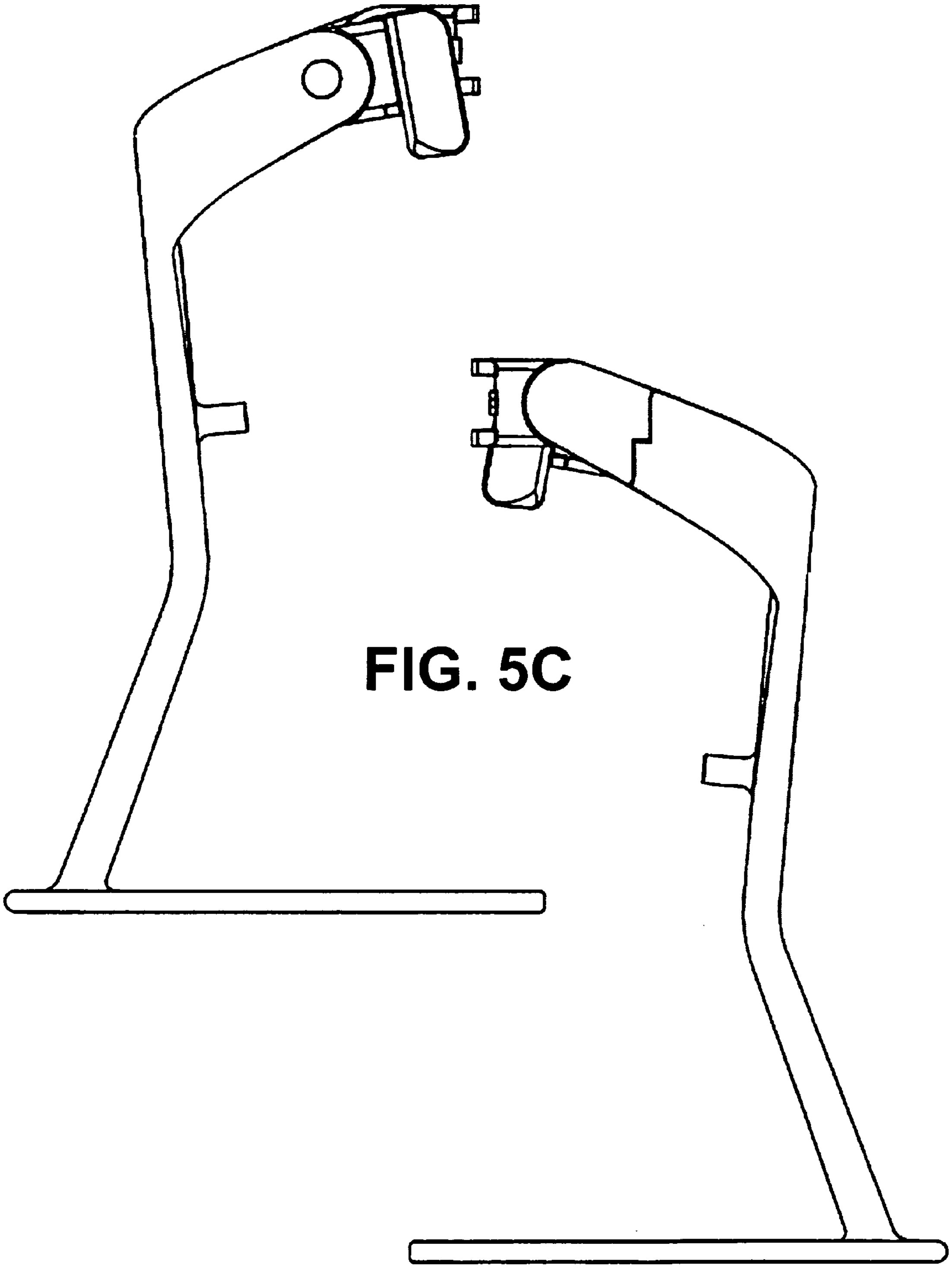
Figure 5D:
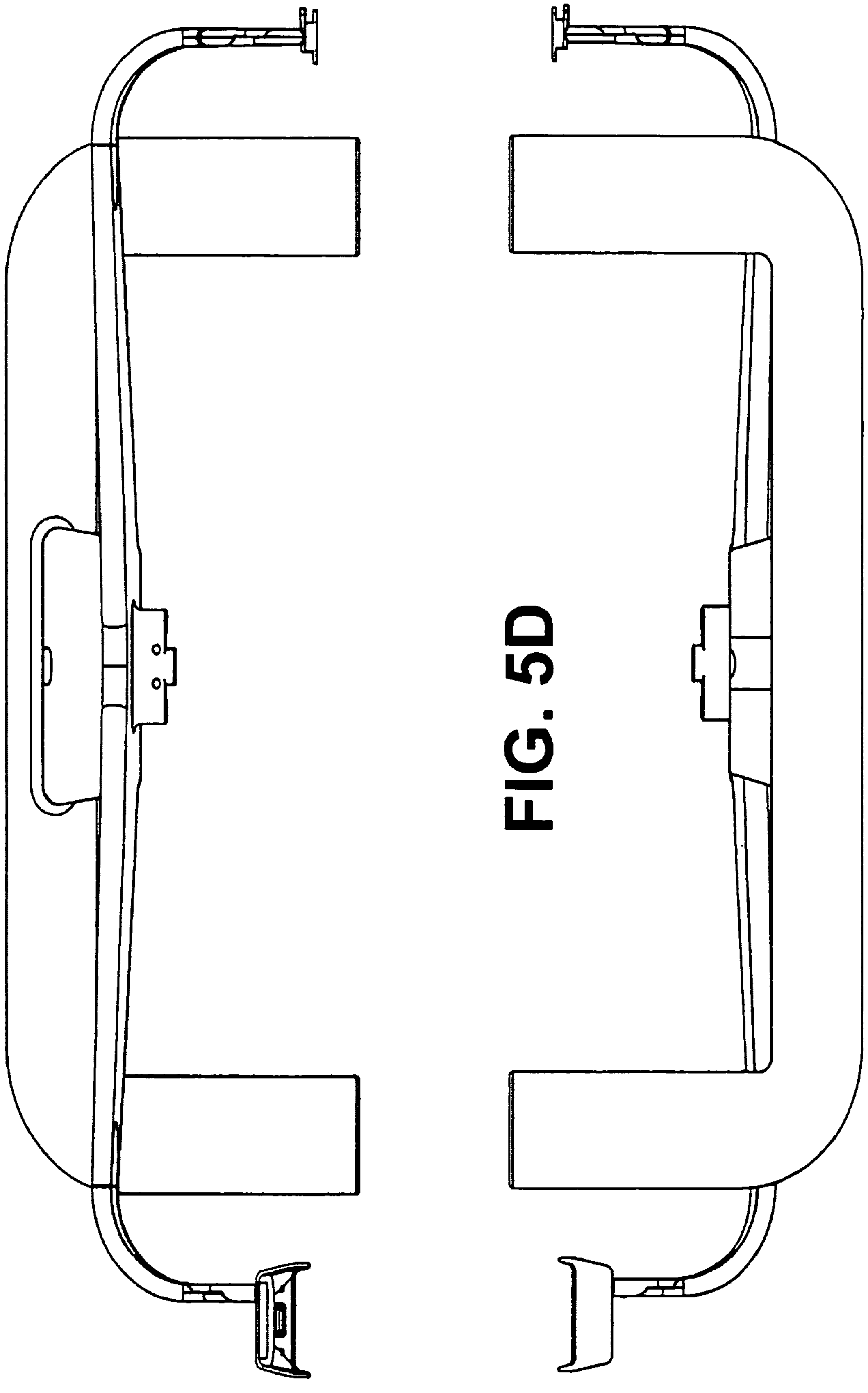
Figure 6A:
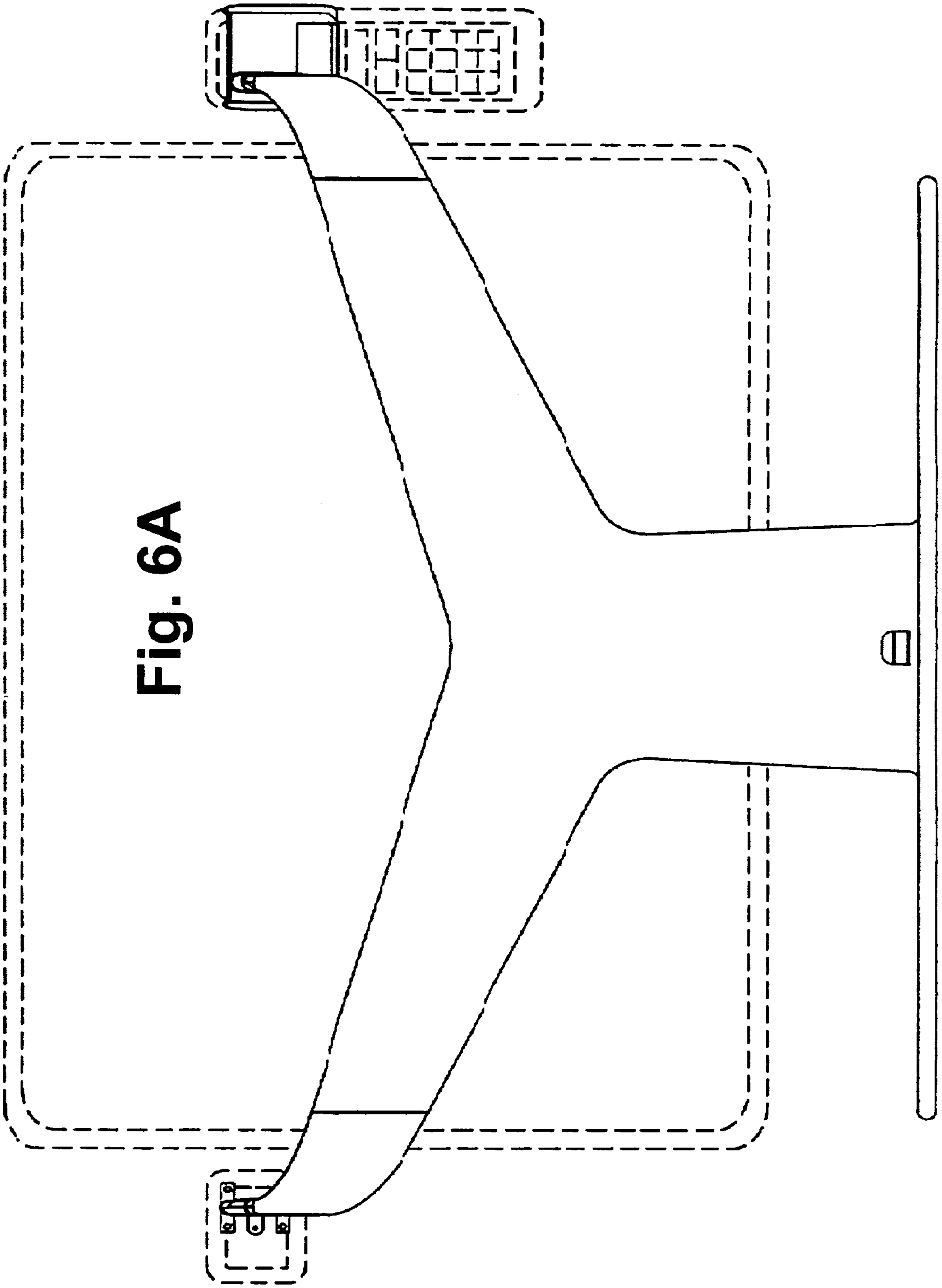
Figure 6B:
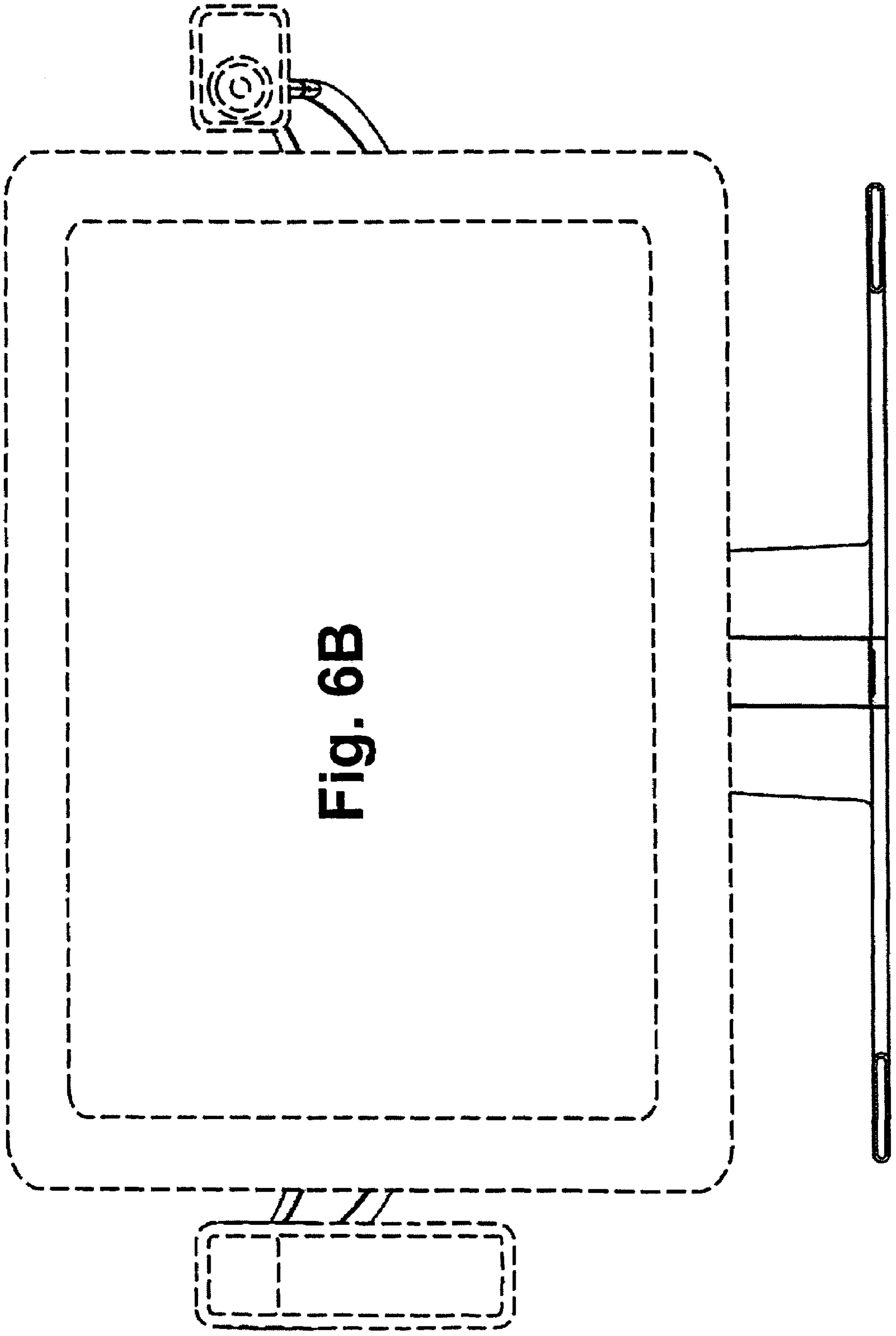
Figure 6C:
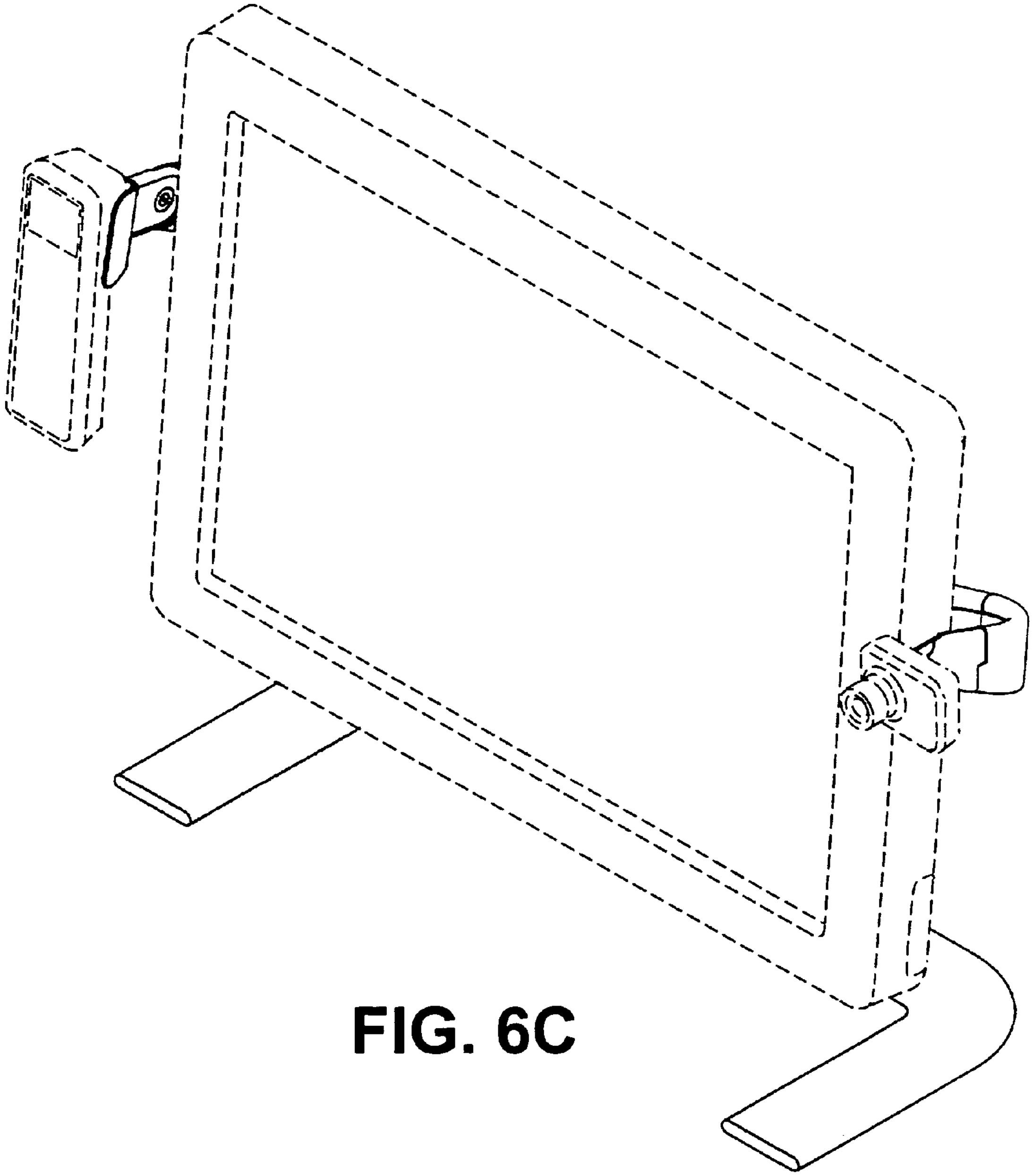
Figure 6D:
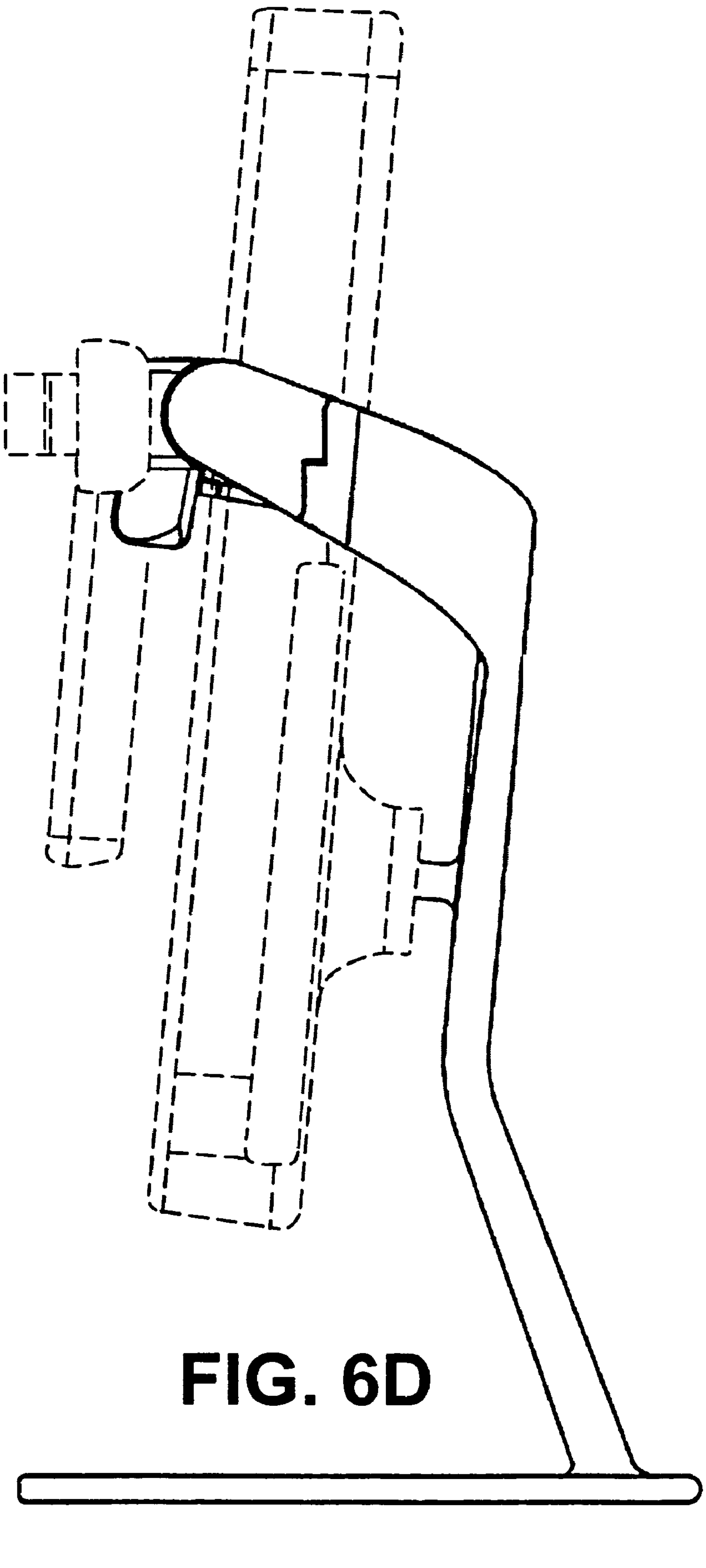
Figure 6E:
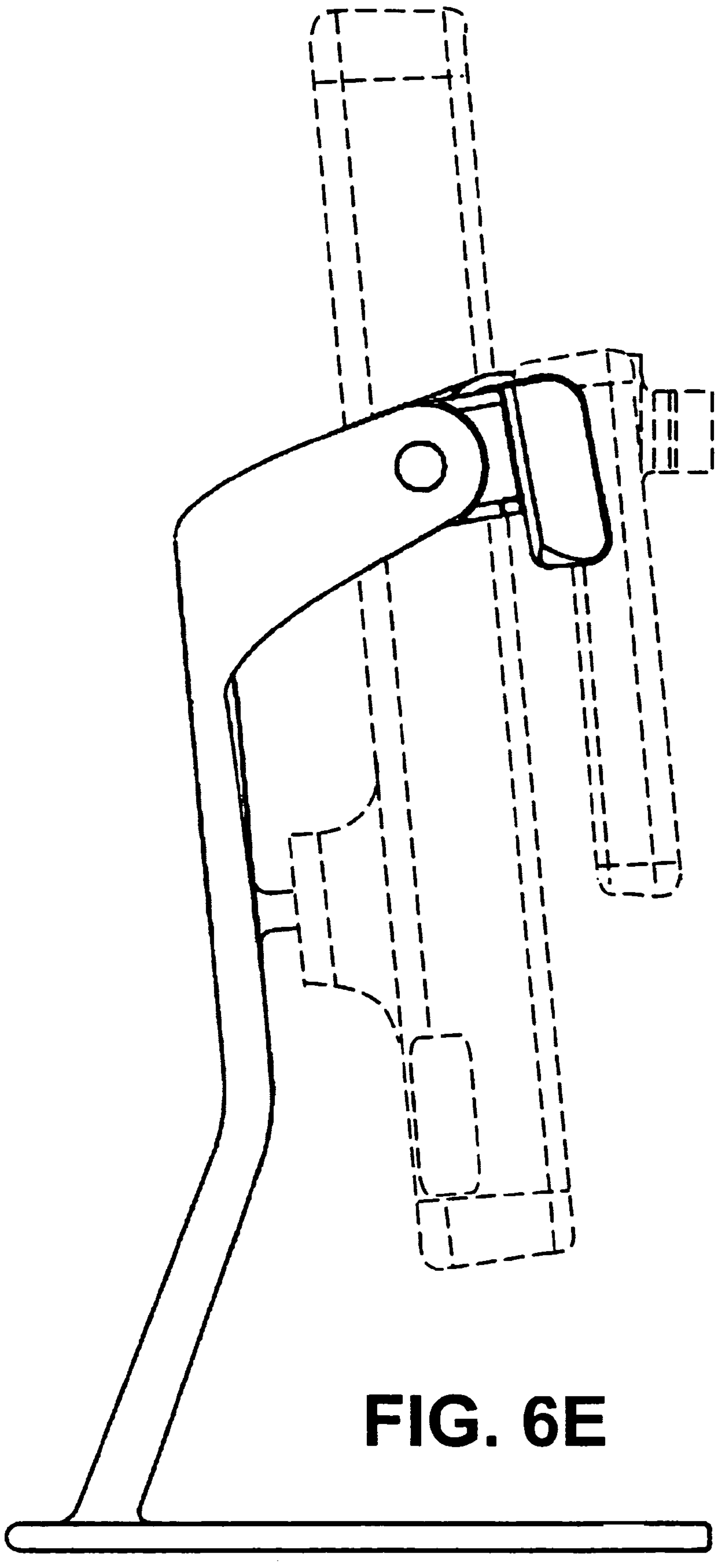

FIGS. 3A to 6E illustrate various design elements that may be implemented in connection with achieving one or more aspects of the improved computing ecosystem of the invention. For instance, the smart stand provided by the invention may be implemented with a substantially V-shaped embodiment as shown in FIGS. 5A to 5D or as a substantially T-shaped embodiment as illustrated in FIGS. 4A to 4D. Both the V-shaped and T-shaped embodiments enable independent pivoting of the handset, monitor and camera as well as integration thereof. One can see the docking rechargeable keyboard, as described above, is also included in such embodiments. The docking keyboard and/or smart stand aspects are emphasized in the design drawings shown in FIGS. 6A to 6E. FIG. 3A illustrates an exemplary design, i.e., the V-shaped design, from 6 angles in one figure. FIG. 3B at the bottom shows another T-shaped variation. FIG. 3C illustrates an exemplary design of a CPU box contemplated by the invention, whereby the power button, drive bays, etc. are placed in other portions of the PC environment, e.g., keyboard or monitor, such that the CPU box can be hidden from direct view, placed on a shelf, etc. As noted above, such a CPU box could include the lighting components and layers contemplated by the invention.

One can appreciate that design drawings emphasize and deemphasize claim scope by dashing certain lines and leaving other lines solid. For instance, FIGS. 6A to 6E emphasize the smart stand itself. In this regard, the invention includes embodiments with dashed lines (for de-emphasis) and solid lines (for emphasis) for emphasizing the handset of the invention, the camera of the invention, the monitor of the invention, the keyboard of the invention, the pivot points for the handset, monitor and camera (separately and together), the legs of the stand that enable mating of the keyboard, the buttons of the keyboard, the buttons of the monitor, the USB connection of the monitor, the “V-shape”, the “T-shape”, the CPU box, the structure of the lighting infrastructure including the $1^{st}$, $2^{nd}$ and $3^{rd}$ layers (separately and together) and any combination of the elements recited in this sentence as well. Subelements, considered alone, of these identified elements have innovative design features as well, and thus subelements and subfeatures, permutations and combinations thereof, also form part of the invention.

There are multiple ways of implementing code that may be used incident to the present invention, e.g., an appropriate API, tool kit, driver code, operating system, control, standalone or downloadable software object, etc. which enables applications and services to use and exploit the improved hardware and infrastructure provided by the invention. The invention contemplates the use of the invention from the standpoint of an API (or other software object), as well as from a software or hardware object that communicates in connection with data generated or used incident to the improved hardware infrastructure of the invention. Thus, various implementations of the invention described herein may have aspects that are wholly in hardware, partly in hardware and partly in software, as well as in software.

As mentioned above, while exemplary embodiments of the present invention have been described in connection with various computing devices and network architectures, the underlying concepts may be applied to any computing device or system for which it is desirable to improve the relationship with the user. For instance, any peripheral or computing device can take advantage of the lighting scheme(s) enabled by the invention, and peripheral or computing device can be integrated into the smart stand, and the algorithm(s) and hardware implementations of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that are used incident to the improved ecosystem of the invention may make use of a data processing API, reusable controls, or the like, which are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device, peripheral or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A computing device or peripheral in a computing system, comprising:

a housing comprising at least one lighting component and an opening for user display means or user input means; and a transparent or translucent layer integrated with a substantial exterior portion of said housing and positioned to provide a secondary source of information viewable in the user's workspace, whereby light emanating from the at least one lighting component propagates through said layer, said light generated according to a lighting scheme associated with a condition in the computing system or an alert from the computing system, the lighting scheme configurable by a user and synchronized among a plurality of communicatively coupled devices in a computing ecosystem, wherein said condition is based upon whether a task being performed is associated with a primary zone, a secondary zone or a tertiary zone of the computing system , wherein said primary zone is the location for tasks requiring fine motor control, the secondary zone is the location for tasks requiring gross motor movement and the tertiary work zone is the location for infrequently performed tasks or actions.

2. A computing device or peripheral according to claim 1, wherein said condition is at least one of a state of the computing system and a notification received in the computing system.

3. A computing device or peripheral according to claim 1, wherein the condition includes at least one of a state of the computing system, a state of a subsystem of the computing system, a power state, a notification from another person and a notification by the computing system, each of which has a lighting scheme associated therewith.

4. A computing device or peripheral according to claim 3, wherein the at least one state of the computing system includes a system standby mode, a system turned on mode, a system in use mode, a do not disturb system state and a system health state.

5. A computing device or peripheral according to claim 4, wherein a single command in the computing system places the computing system in the do not disturb system state.

6. A computing device or peripheral according to claim 4, wherein the computing system, when in the do not disturb state, at least one of automatically directs incoming voice calls to a voice mail inbox, automatically indicates that the user is unavailable for instant messaging (IM) discussions and automatically enables an email auto reply indicating unavailability.

7. A computing device or peripheral according to claim 4, wherein the computing system, when in the do not disturb state, is configurable to allow specified third parties to reach the user under specified circumstances.

8. A computing device or peripheral according to claim 1, wherein the alert includes at least one of a printer out of paper alert, a printer jammed alert, a network connection interrupted alert, a software update alert, a user specified alert, a memory is full alert, a processor is slowing down alert, a virus alert, a hardware bug alert, a software bug alert, a disc defragmentation alert, an alert concerning whether the user should enable or disable macros and an alert that the computing system performing optimally.

9. A computing device or peripheral according to claim 1, wherein the lighting scheme includes a predetermined pattern of at least one color.

10. A computing device or peripheral according to claim 1, wherein the lighting scheme includes a predetermined pattern of lighting brightness or intensity.

11. A computing device or peripheral according to claim 1, wherein a sound scheme is rendered in conjunction with the lighting scheme.

12. A computing device or peripheral according to claim 1, wherein the computing device is at least one of a monitor, a central processing unit (CPU) epicenter, a mouse, a printer and a keyboard.

13. A computing device or peripheral according to claim 1, wherein a change in condition in the computing system results in a switch from a first lighting scheme to a second lighting scheme.

14. A computing device or peripheral according to claim 13, wherein the second lighting scheme is associated with a different computing device or peripheral in the computing system.

15. A computing device or peripheral according to claim 1, wherein said computing device is a monitor, and said transparent or translucent layer is a bezel of a screen of the monitor.

16. A computing device or peripheral according to claim 1, wherein said condition is based upon whether a task being performed is associated with a primary zone, a secondary zone or a tertiary zone of the computing system.

17. A method for providing lighting on a housing of a computing device or peripheral in a computing system, said housing comprising at least one lighting component and an opening for user display means or user input means, the method comprising:

receiving indication that a condition has manifested in the computing system; and activating said at least one light source according to a lighting scheme associated with the condition, whereby light emanating from the at least one light source propagates through a transparent or translucent layer integrated with the housing, the clear or translucent layer positioned to provide a secondary source of user interface information and synchronized among a plurality of communicatively coupled devices in a computing ecosystem, wherein said condition is based upon whether a task being performed is associated with a primary zone, a secondary zone or a tertiary zone of the computing system, wherein said primary zone is the location for tasks requiring fine motor control, the secondary zone is the location for tasks requiring gross motor movement and the tertiary work zone is the location for infrequently performed tasks or actions.

18. A method according to claim 17, wherein said receiving includes receiving indication that at least one of a state of the computing system and a notification has manifested in the computing system.

19. A method according to claim 18, wherein the at least one state of the computing system includes a system standby mode, a system turned on mode, a system in use mode, a do not disturb system state and a system health state.

20. A method according to claim 17, wherein the condition includes at least one of a state of the computing system, a state of a subsystem of the computing system, a power state, a notification from another person and a notification by the computing system, each of which has a lighting scheme associated therewith.

21. A method according to claim 17, wherein said lighting includes configuring when and how an associated lighting scheme occurs.

22. A method according to claim 17, wherein said lighting includes notifying the user of an alert in the computing system.

23. A method according to claim 17, wherein said lighting according to a lighting scheme includes lighting according to at least one of a predetermined pattern of at least one color, a predetermined pattern of lighting brightness or intensity, and providing a sound scheme with said lighting scheme.

24. A computer readable storage medium comprising computer executable instructions for providing lighting on a housing of a computing device or peripheral in a computing system, said housing comprising at least one lighting component and an opening for user display means or user input means, whereby the at least one light source provides light that propagates through a transparent or translucent layer integrated with the housing, the clear or translucent layer positioned to provide a secondary source of user interface information, comprising:

instructions for receiving indication that a condition has manifested in the computing system; and instructions for lighting said at least one light source according to a lighting scheme associated with the condition, said lighting scheme configurable by a user and synchronized among a plurality of communicatively coupled devices in a computing ecosystem;

wherein said condition is based upon whether a task being performed is associated with a primary zone, a secondary zone or a tertiary zone of the computing system, wherein said primary zone is the location for tasks requiring fine motor control, the secondary zone is the location for tasks requiring gross motor movement and the tertiary work zone is the location for infrequently performed tasks or actions.

* * * * *